US011068927B2

(12) United States Patent
Toupet et al.

(10) Patent No.: US 11,068,927 B2
(45) Date of Patent: *Jul. 20, 2021

(54) METHODS AND APPARATUS TO CORRECT AUDIENCE MEASUREMENT DATA

(71) Applicant: The Nielsen Company (US), LLC, New York, NY (US)

(72) Inventors: Antonia Toupet, Sunnyvale, CA (US); Peng Fei Yi, Shanghai (CN); Seema Varma Srivastava, Sunnyvale, CA (US)

(73) Assignee: The Nielsen Company (US), LLC, New York, NY (US)

( * ) Notice: Subject to any disclaimer, the term of this patent is extended or adjusted under 35 U.S.C. 154(b) by 152 days.

This patent is subject to a terminal disclaimer.

(21) Appl. No.: 16/196,481

(22) Filed: Nov. 20, 2018

(65) Prior Publication Data

US 2019/0087853 A1    Mar. 21, 2019

Related U.S. Application Data

(63) Continuation of application No. 14/502,409, filed on Sep. 30, 2014, now Pat. No. 10,147,114.

(Continued)

(51) Int. Cl.
*G06Q 30/02* (2012.01)
*G06Q 50/00* (2012.01)

(52) U.S. Cl.
CPC ........ *G06Q 30/0242* (2013.01); *G06Q 50/01* (2013.01)

(58) Field of Classification Search
None
See application file for complete search history.

(56) References Cited

U.S. PATENT DOCUMENTS 3,406,516 A  10/1968 Yates
5,584,050 A  12/1996 Lyons
(Continued)

FOREIGN PATENT DOCUMENTS

AU   2013205736   5/2013
CN   1898662      1/2007
(Continued)

OTHER PUBLICATIONS

Nekovee etal, An Adaptive Method for Dynamic Audience Size Estimation in Multicast, B. Stiller et al. (Eds.): NGC/ICQT 2003, LNCS 2816, pp. 23-33, 2003, Springer-Verlag Berlin Heidelberg 2003 (Year: 2003).*

(Continued)

*Primary Examiner* — Marie P Brady
(74) *Attorney, Agent, or Firm* — Hanley, Flight & Zimmerman, LLC

(57) ABSTRACT

An example involves determining a missing-audience factor based on first impressions corresponding to first client devices that do not have database proprietor (DP) identifiers for use by a DP to identify subscribers registered with the DP, and based on second impressions corresponding to second client devices that do have the DP identifiers used by the DP to identify subscribers registered with the DP. The first impressions represent accesses to media via the first client devices. The second impressions represent access to the media via the second client devices. The example involves determining a coverage-corrected unique audience (CCUA) size based on the missing-audience factor and a UA size of DP subscribers exposed to the media. The UA size is determined based on impressions logged by the DP. The CCUA size corresponds to impressions logged by the DP and not logged by the DP.

25 Claims, 6 Drawing Sheets

Related U.S. Application Data

(60) Provisional application No. 61/923,967, filed on Jan. 6, 2014.

(56) References Cited

U.S. PATENT DOCUMENTS

| | | | |
|---|---|---|---|
| 5,594,934 A | 1/1997 | Lu et al. | |
| 5,675,510 A | 10/1997 | Coffey et al. | |
| 5,796,952 A | 8/1998 | Davis et al. | |
| 5,832,520 A | 11/1998 | Miller | |
| 5,848,396 A | 12/1998 | Gerace | |
| 5,870,740 A | 2/1999 | Rose et al. | |
| 5,948,061 A | 9/1999 | Merriman et al. | |
| 6,035,339 A | 3/2000 | Agraharam et al. | |
| 6,052,730 A | 4/2000 | Feliciano et al. | |
| 6,055,573 A | 4/2000 | Gardenswartz et al. | |
| 6,098,093 A | 8/2000 | Bayeh et al. | |
| 6,102,406 A | 8/2000 | Miles et al. | |
| 6,108,637 A | 8/2000 | Blumenau | |
| 6,138,155 A | 10/2000 | Davis et al. | |
| 6,141,694 A | 10/2000 | Gardner | |
| 6,223,215 B1 | 4/2001 | Hunt et al. | |
| 6,279,036 B1 | 8/2001 | Himmel et al. | |
| 6,286,140 B1 | 9/2001 | Ivanyi | |
| 6,415,323 B1 | 7/2002 | McCanne et al. | |
| 6,434,614 B1 | 8/2002 | Blumenau | |
| 6,457,010 B1 | 9/2002 | Eldering et al. | |
| 6,460,079 B1 | 10/2002 | Blumenau | |
| 6,529,952 B1 | 3/2003 | Blumenau | |
| 6,606,657 B1 | 8/2003 | Zilberstein et al. | |
| 6,658,410 B1 | 12/2003 | Sakamaki et al. | |
| 6,704,787 B1 | 3/2004 | Umbreit | |
| 6,714,917 B1 | 3/2004 | Eldering et al. | |
| 6,839,680 B1 | 1/2005 | Liu et al. | |
| 6,877,007 B1 | 4/2005 | Hentzel et al. | |
| 6,993,590 B1 | 1/2006 | Gauthier et al. | |
| 7,039,699 B1 | 5/2006 | Narin et al. | |
| 7,092,926 B2 | 8/2006 | Cerrato | |
| 7,139,723 B2 | 11/2006 | Conkwright et al. | |
| 7,146,329 B2 | 12/2006 | Conkwright et al. | |
| 7,150,030 B1 | 12/2006 | Eldering et al. | |
| 7,152,074 B2 | 12/2006 | Dettinger et al. | |
| 7,159,023 B2 | 1/2007 | Tufts | |
| 7,181,412 B1 | 2/2007 | Fulgoni et al. | |
| 7,260,837 B2 | 8/2007 | Abraham et al. | |
| 7,272,617 B1 | 9/2007 | Bayer et al. | |
| 7,302,447 B2 | 11/2007 | Dettinger et al. | |
| 7,343,417 B2 | 3/2008 | Baum | |
| 7,363,643 B2 | 4/2008 | Drake et al. | |
| 7,386,473 B2 | 6/2008 | Blumenau | |
| 7,406,516 B2 | 7/2008 | Davis et al. | |
| 7,546,370 B1 | 6/2009 | Acharya et al. | |
| 7,590,568 B2 | 9/2009 | Blumenau | |
| 7,613,635 B2 | 11/2009 | Blumenau | |
| 7,634,786 B2 | 12/2009 | Knee et al. | |
| 7,644,156 B2 | 1/2010 | Blumenau | |
| 7,647,418 B2 | 1/2010 | Ash et al. | |
| 7,650,407 B2 | 1/2010 | Blumenau | |
| 7,653,724 B2 | 1/2010 | Blumenau | |
| 7,716,326 B2 | 5/2010 | Blumenau | |
| 7,720,963 B2 | 5/2010 | Blumenau | |
| 7,720,964 B2 | 5/2010 | Blumenau | |
| 7,756,974 B2 | 7/2010 | Blumenau | |
| 7,788,216 B2 | 8/2010 | Li et al. | |
| 7,882,054 B2 | 2/2011 | Levitan | |
| 7,882,242 B2 | 2/2011 | Chen | |
| 7,890,451 B2 | 2/2011 | Cancel et al. | |
| 7,925,694 B2 | 4/2011 | Harris | |
| 7,941,525 B1 | 5/2011 | Yavilevich | |
| 7,949,565 B1 | 5/2011 | Eldering et al. | |
| 7,949,639 B2 | 5/2011 | Hunt et al. | |
| 7,958,234 B2 | 6/2011 | Thomas et al. | |
| 7,962,603 B1 | 6/2011 | Morimoto | |
| 8,006,259 B2 | 8/2011 | Drake et al. | |
| 8,046,255 B2 | 10/2011 | Bistriceanu et al. | |
| 8,060,601 B1 | 11/2011 | Brown et al. | |
| 8,087,041 B2 | 12/2011 | Fu et al. | |
| 8,131,763 B2 | 3/2012 | Tuscano et al. | |
| 8,131,861 B2 | 3/2012 | Butler et al. | |
| 8,151,194 B1 | 4/2012 | Chan et al. | |
| 8,151,291 B2 | 4/2012 | Ramaswamy | |
| 8,180,112 B2 | 5/2012 | Kurtz et al. | |
| 8,229,780 B2 | 7/2012 | Davidow et al. | |
| 8,235,814 B2 | 8/2012 | Willis et al. | |
| 8,266,687 B2 | 9/2012 | Baldry | |
| 8,271,886 B2 | 9/2012 | Lee et al. | |
| 8,280,683 B2 | 10/2012 | Finkler | |
| 8,302,120 B2 | 10/2012 | Ramaswamy | |
| 8,307,006 B2 | 11/2012 | Hannan et al. | |
| 8,370,489 B2 | 2/2013 | Mazumdar et al. | |
| 8,412,648 B2 | 4/2013 | Karypis et al. | |
| 8,453,173 B1 | 5/2013 | Anderson et al. | |
| 8,484,511 B2 * | 7/2013 | Tidwell | H04N 21/458 714/15 |
| 8,495,198 B2 | 7/2013 | Sim et al. | |
| 8,504,411 B1 | 8/2013 | Subasic et al. | |
| 8,504,507 B1 | 8/2013 | Srinivasaiah | |
| 8,514,907 B2 | 8/2013 | Wright et al. | |
| 8,543,454 B2 | 9/2013 | Fleischman et al. | |
| 8,549,552 B2 | 10/2013 | Ramaswamy et al. | |
| 8,600,796 B1 | 12/2013 | Sterne et al. | |
| 8,631,122 B2 | 1/2014 | Kadam et al. | |
| 8,688,524 B1 | 4/2014 | Ramalingam et al. | |
| 8,700,457 B2 | 4/2014 | Craft | |
| 8,713,168 B2 | 4/2014 | Heffernan et al. | |
| 8,751,461 B2 | 6/2014 | Abraham et al. | |
| 8,775,332 B1 | 7/2014 | Morris et al. | |
| 8,831,362 B1 | 9/2014 | Steffens | |
| 8,843,626 B2 | 9/2014 | Mazumdar et al. | |
| 8,874,652 B1 * | 10/2014 | Pecjak | G06Q 30/0204 709/204 |
| 8,898,689 B2 | 11/2014 | Georgakis | |
| 8,909,771 B2 | 12/2014 | Heath | |
| 8,910,195 B1 | 12/2014 | Barney et al. | |
| 8,930,701 B2 | 1/2015 | Burbank et al. | |
| 8,954,536 B2 | 2/2015 | Kalus et al. | |
| 8,973,023 B1 * | 3/2015 | Rao | H04N 21/25891 725/14 |
| 8,984,547 B2 | 3/2015 | Lambert et al. | |
| 9,055,122 B2 | 6/2015 | Grecco et al. | |
| 9,083,853 B2 | 7/2015 | Shkedi | |
| 9,117,217 B2 | 8/2015 | Wilson et al. | |
| 9,215,288 B2 | 12/2015 | Seth et al. | |
| 9,237,138 B2 | 1/2016 | Bosworth et al. | |
| 9,269,049 B2 | 2/2016 | McCann et al. | |
| 9,301,007 B2 | 3/2016 | Ramaswamy | |
| 9,430,746 B2 * | 8/2016 | Pecjak | G06Q 30/0201 |
| 9,438,939 B2 | 9/2016 | Wright et al. | |
| 9,519,914 B2 | 12/2016 | Splaine et al. | |
| 9,948,530 B1 * | 4/2018 | Niederstrasser | H04L 43/062 |
| 10,147,114 B2 | 12/2018 | Toupet et al. | |
| 2002/0099609 A1 | 7/2002 | Nascenzi et al. | |
| 2003/0006911 A1 | 1/2003 | Smith et al. | |
| 2003/0037131 A1 | 2/2003 | Verma | |
| 2003/0046385 A1 | 3/2003 | Vincent | |
| 2003/0065770 A1 | 4/2003 | Davis et al. | |
| 2003/0105604 A1 | 6/2003 | Ash et al. | |
| 2003/0177488 A1 | 9/2003 | Smith et al. | |
| 2003/0220901 A1 | 11/2003 | Carr et al. | |
| 2004/0088212 A1 | 5/2004 | Hill | |
| 2004/0107125 A1 | 6/2004 | Guheen et al. | |
| 2004/0167763 A1 | 8/2004 | Liebman | |
| 2004/0167928 A1 | 8/2004 | Anderson et al. | |
| 2004/0186840 A1 | 9/2004 | Dettinger et al. | |
| 2005/0166233 A1 | 7/2005 | Beyda et al. | |
| 2005/0223093 A1 | 10/2005 | Hanson et al. | |
| 2005/0267799 A1 | 12/2005 | Chan et al. | |
| 2006/0074953 A1 | 4/2006 | Dettinger et al. | |
| 2006/0089754 A1 | 4/2006 | Mortenson | |
| 2006/0178996 A1 | 8/2006 | Matsushima et al. | |
| 2006/0271641 A1 | 11/2006 | Stavrakos et al. | |
| 2006/0294259 A1 | 12/2006 | Matefi et al. | |
| 2007/0043769 A1 | 2/2007 | Kasahara et al. | |
| 2007/0106787 A1 | 5/2007 | Blumenau | |
| 2007/0106792 A1 | 5/2007 | Blumenau | |

(56) References Cited

U.S. PATENT DOCUMENTS

| | | |
|---|---|---|
| 2007/0112714 A1 | 5/2007 | Fairweather |
| 2007/0156532 A1 | 7/2007 | Nyhan et al. |
| 2007/0198327 A1 | 8/2007 | Yazdani et al. |
| 2007/0260603 A1 | 11/2007 | Tuscano et al. |
| 2007/0271518 A1 | 11/2007 | Tischer et al. |
| 2007/0271580 A1 | 11/2007 | Tischer et al. |
| 2008/0004958 A1 | 1/2008 | Ralph et al. |
| 2008/0086356 A1 | 4/2008 | Glassman et al. |
| 2008/0091639 A1 | 4/2008 | Davis et al. |
| 2008/0126420 A1 | 5/2008 | Wright et al. |
| 2008/0201427 A1 | 8/2008 | Chen |
| 2008/0201472 A1 | 8/2008 | Bistriceanu et al. |
| 2008/0222201 A1 | 9/2008 | Chen et al. |
| 2008/0235243 A1 | 9/2008 | Lee et al. |
| 2008/0248815 A1 | 10/2008 | Busch |
| 2008/0276179 A1 | 11/2008 | Borenstein et al. |
| 2008/0300965 A1 | 12/2008 | Doe |
| 2009/0030780 A1 | 1/2009 | York et al. |
| 2009/0055241 A1 | 2/2009 | Chen et al. |
| 2009/0070443 A1 | 3/2009 | Vanderhook et al. |
| 2009/0070797 A1 | 3/2009 | Ramaswamy et al. |
| 2009/0076899 A1 | 3/2009 | Gbodimowo |
| 2009/0171762 A1 | 7/2009 | Alkove et al. |
| 2009/0217315 A1 | 8/2009 | Malik et al. |
| 2009/0292587 A1 | 11/2009 | Fitzgerald |
| 2009/0293001 A1 | 11/2009 | Lu et al. |
| 2009/0307084 A1 | 12/2009 | Monighetti et al. |
| 2009/0327026 A1 | 12/2009 | Bistriceanu et al. |
| 2010/0010866 A1 | 1/2010 | Bal et al. |
| 2010/0070621 A1 | 3/2010 | Urdan et al. |
| 2010/0088152 A1 | 4/2010 | Bennett |
| 2010/0088373 A1 | 4/2010 | Pinkham |
| 2010/0121676 A1 | 5/2010 | Jackson |
| 2010/0153175 A1 | 6/2010 | Pearson et al. |
| 2010/0153544 A1 | 6/2010 | Krassner et al. |
| 2010/0161385 A1 | 6/2010 | Karypis et al. |
| 2010/0191723 A1 | 7/2010 | Perez et al. |
| 2010/0205057 A1 | 8/2010 | Hook et al. |
| 2010/0241745 A1 | 9/2010 | Offen et al. |
| 2010/0262498 A1 | 10/2010 | Nolet et al. |
| 2010/0268540 A1 | 10/2010 | Arshi et al. |
| 2010/0268573 A1 | 10/2010 | Jain et al. |
| 2010/0281178 A1 | 11/2010 | Sullivan |
| 2010/0299604 A1 | 11/2010 | Blumenau |
| 2010/0312854 A1 | 12/2010 | Hyman |
| 2010/0313009 A1 | 12/2010 | Cornbet et al. |
| 2010/0325051 A1 | 12/2010 | Etchegoyen |
| 2011/0016482 A1 | 1/2011 | Tidwell et al. |
| 2011/0041062 A1 | 2/2011 | Singer et al. |
| 2011/0087519 A1 | 4/2011 | Fordyce, III et al. |
| 2011/0093327 A1 | 4/2011 | Fordyce, III et al. |
| 2011/0106620 A1 | 5/2011 | Setiawan et al. |
| 2011/0131596 A1 | 6/2011 | Amsterdam et al. |
| 2011/0137733 A1 | 6/2011 | Baird et al. |
| 2011/0153391 A1 | 6/2011 | Tenbrock |
| 2011/0157475 A1 | 6/2011 | Wright et al. |
| 2011/0191184 A1 | 8/2011 | Blackhurst et al. |
| 2011/0191664 A1 | 8/2011 | Sheleheda et al. |
| 2011/0191831 A1 | 8/2011 | Chan et al. |
| 2011/0196735 A1 | 8/2011 | von Sydow et al. |
| 2011/0202500 A1 | 8/2011 | Warn et al. |
| 2011/0208860 A1 | 8/2011 | Sim et al. |
| 2011/0231240 A1 | 9/2011 | Schoen et al. |
| 2011/0246297 A1 | 10/2011 | Buchalter et al. |
| 2011/0246306 A1 | 10/2011 | Blackhurst et al. |
| 2011/0246641 A1 | 10/2011 | Pugh et al. |
| 2011/0282730 A1 | 11/2011 | Tarmas |
| 2011/0288907 A1 | 11/2011 | Harvey et al. |
| 2012/0005213 A1 | 1/2012 | Hannan et al. |
| 2012/0030037 A1 | 2/2012 | Carriero |
| 2012/0042005 A1 | 2/2012 | Papakostas et al. |
| 2012/0072469 A1 | 3/2012 | Perez et al. |
| 2012/0109709 A1 | 5/2012 | Fordyce, III et al. |
| 2012/0109882 A1 | 5/2012 | Bouse et al. |
| 2012/0110027 A1 | 5/2012 | Falcon |
| 2012/0110071 A1 | 5/2012 | Zhou et al. |
| 2012/0143713 A1 | 6/2012 | Dittus et al. |
| 2012/0151079 A1 | 6/2012 | Besehanic et al. |
| 2012/0151322 A1 | 6/2012 | Lindsay et al. |
| 2012/0158490 A1 | 6/2012 | Neumeyer et al. |
| 2012/0158954 A1 | 6/2012 | Heffernan et al. |
| 2012/0166520 A1 | 6/2012 | Lindsay et al. |
| 2012/0173701 A1 | 7/2012 | Tenbrock |
| 2012/0185274 A1 | 7/2012 | Hu |
| 2012/0192214 A1 | 7/2012 | Hunn et al. |
| 2012/0206331 A1 | 8/2012 | Gandhi |
| 2012/0209920 A1 | 8/2012 | Neystadt et al. |
| 2012/0215621 A1* | 8/2012 | Heffernan ......... H04L 29/08936 705/14.41 |
| 2012/0239407 A1 | 9/2012 | Lynch et al. |
| 2012/0239809 A1 | 9/2012 | Mazumdar et al. |
| 2012/0265606 A1 | 10/2012 | Patnode |
| 2012/0302222 A1 | 11/2012 | Williamson et al. |
| 2012/0310729 A1 | 12/2012 | Dalto et al. |
| 2012/0311017 A1 | 12/2012 | Sze et al. |
| 2013/0007794 A1 | 1/2013 | Besehanic et al. |
| 2013/0013308 A1 | 1/2013 | Cao et al. |
| 2013/0014144 A1 | 1/2013 | Bhatia et al. |
| 2013/0019262 A1 | 1/2013 | Bhatia et al. |
| 2013/0046615 A1 | 2/2013 | Liyanage |
| 2013/0060629 A1 | 3/2013 | Rangsikitpho et al. |
| 2013/0066713 A1 | 3/2013 | Umeda |
| 2013/0080263 A1 | 3/2013 | Goldman et al. |
| 2013/0097311 A1 | 4/2013 | Mazumdar et al. |
| 2013/0097312 A1 | 4/2013 | Mazumdar et al. |
| 2013/0117103 A1 | 5/2013 | Shimizu et al. |
| 2013/0124628 A1 | 5/2013 | Weerasinghe |
| 2013/0138506 A1 | 5/2013 | Zhu et al. |
| 2013/0138743 A1 | 5/2013 | Amento et al. |
| 2013/0145022 A1 | 6/2013 | Srivastava et al. |
| 2013/0159499 A1 | 6/2013 | Besehanic |
| 2013/0198125 A1 | 8/2013 | Oliver et al. |
| 2013/0204694 A1 | 8/2013 | Banister et al. |
| 2013/0212188 A1 | 8/2013 | Duterque et al. |
| 2013/0246389 A1 | 9/2013 | Osann, Jr. |
| 2013/0246609 A1 | 9/2013 | Topchy et al. |
| 2013/0282898 A1 | 10/2013 | Kalus et al. |
| 2013/0290070 A1 | 10/2013 | Abraham et al. |
| 2013/0297411 A1 | 11/2013 | Van Datta et al. |
| 2013/0325588 A1 | 12/2013 | Kalyanam et al. |
| 2013/0331971 A1 | 12/2013 | Bida et al. |
| 2013/0332604 A1 | 12/2013 | Seth et al. |
| 2014/0033317 A1 | 1/2014 | Barber |
| 2014/0058836 A1 | 2/2014 | Wiseman et al. |
| 2014/0075004 A1 | 3/2014 | Van Dusen et al. |
| 2014/0108130 A1 | 4/2014 | Vos et al. |
| 2014/0122703 A1 | 5/2014 | Pugh et al. |
| 2014/0156761 A1 | 6/2014 | Heffernan et al. |
| 2014/0279074 A1 | 9/2014 | Chen et al. |
| 2014/0280891 A1* | 9/2014 | Doe ..................... G06Q 30/02 709/224 |
| 2014/0298025 A1 | 10/2014 | Burbank et al. |
| 2014/0324544 A1 | 10/2014 | Donato et al. |
| 2014/0324545 A1 | 10/2014 | Splaine et al. |
| 2014/0337104 A1 | 11/2014 | Splaine et al. |
| 2015/0019322 A1 | 1/2015 | Alla et al. |
| 2015/0019327 A1 | 1/2015 | Mazumdar et al. |
| 2015/0046579 A1 | 2/2015 | Perez et al. |
| 2015/0193816 A1 | 6/2015 | Toupet et al. |
| 2015/0186403 A1 | 7/2015 | Srivastava et al. |
| 2015/0189500 A1 | 7/2015 | Bosworth et al. |
| 2015/0193813 A1 | 7/2015 | Toupet et al. |
| 2015/0262207 A1 | 9/2015 | Rao et al. |
| 2015/0278858 A1 | 10/2015 | Lyons et al. |
| 2015/0324837 A1* | 11/2015 | Shimizu ............. G06Q 30/0242 705/14.43 |
| 2020/0273049 A1* | 8/2020 | Pugh .................... H04L 63/10 |

FOREIGN PATENT DOCUMENTS

| | | |
|---|---|---|
| CN | 101077014 | 11/2007 |
| CN | 101222348 | 7/2008 |
| CN | 101505247 | 8/2009 |
| CN | 10153656503 | 9/2009 |

(56) References Cited

FOREIGN PATENT DOCUMENTS

| | | |
|---|---|---|
| CN | 104520839 | 4/2015 |
| CN | 104541513 | 4/2015 |
| CN | 104584564 | 4/2015 |
| GB | 2176639 | 12/1986 |
| JP | 07262167 | 10/1995 |
| JP | 2001282982 | 10/2001 |
| JP | 2001357192 | 12/2001 |
| JP | 2002163562 | 6/2002 |
| JP | 2002373152 | 12/2002 |
| JP | 2004504674 | 2/2004 |
| JP | 2006127320 | 5/2006 |
| JP | 2006127321 | 5/2006 |
| JP | 2010039845 | 2/2010 |
| JP | 2010257448 | 11/2010 |
| KR | 20020037980 | 5/2002 |
| KR | 20090020558 | 2/2009 |
| KR | 20100094021 | 8/2010 |
| KR | 20110017895 | 2/2011 |
| KR | 20110023293 | 3/2011 |
| KR | 20120091411 | 8/2012 |
| KR | 20120123148 | 11/2012 |
| WO | 9617467 | 6/1996 |
| WO | 9628904 | 9/1996 |
| WO | 9641495 | 12/1996 |
| WO | 2000041115 | 7/2000 |
| WO | 200207054 | 1/2002 |
| WO | 2003027860 | 4/2003 |
| WO | 2005013072 | 2/2005 |
| WO | 2005024689 | 3/2005 |
| WO | 2008150575 | 12/2008 |
| WO | 2010088372 | 8/2010 |
| WO | 2010104285 | 9/2010 |
| WO | 200152168 | 7/2011 |
| WO | 2011097624 | 8/2011 |
| WO | 2012019643 | 2/2012 |
| WO | 2012040371 | 3/2012 |
| WO | 2012087954 | 6/2012 |
| WO | 2012128895 | 9/2012 |
| WO | 2012170902 | 12/2012 |
| WO | 2012177866 | 12/2012 |
| WO | 2013122907 | 8/2013 |
| WO | 2013188429 | 12/2013 |
| WO | 2014059319 | 4/2014 |
| WO | 2014176343 | 10/2014 |
| WO | 2014179218 | 11/2014 |
| WO | 2014182764 | 11/2014 |
| WO | 2015005957 | 1/2015 |
| WO | 2015023589 | 2/2015 |
| WO | 2015102794 | 7/2015 |
| WO | 2015102795 | 7/2015 |
| WO | 2015102796 | 7/2015 |
| WO | 2015102803 | 7/2015 |

OTHER PUBLICATIONS

Koehleretal, "A Method for Measuring Online Audiences", Google Inc (2013), pp. 1-24, https://research.google/pubs/pub41089/ (Year: 2013).*

Jeffries-Fox, Bruce, A Primer in Internet Audience Measurement, igital PR Guidebook: 178-184. Rockville: Access Intelligence LLC. (2007/2008) (Year: 2007).*

Berstein et al, Quantifying the Invisible Audience in Social Networks, Managing Social Media, p. 21-30, 2013 (Year: 2013).*

Taboga, Marco, "Linear combinations of normal random variables," from "Lectures on probability and statistics," [http ://www.statlect. com/normal_ distribution_linear_combinations. Htm], 2010, 4 pages.

Goerg et al., "How Many Millenials Visit YouTube? Estimating Unobserved Events From Incomplete Panel Data Conditioned on Demographic Covariates," Apr. 27, 2015, 27 pages, Google Inc.

Goerg et al., "How Many People Visit YouTube? Imputing Missing Events in Panels With Excess Zeros," 2015, 6 pages, Google Inc.

Patent Cooperation Treaty, "International Search Report," issued by the International Searching Authority in connection with PCT Application No. PCT/US2014/068168, dated Mar. 2, 2015, 3 pages.

Patent Cooperation Treaty, "Written Opinion of the International Searching Authority," issued by the International Searching Authority in connection with PCT Application No. PCT/US2014/068168, dated Mar. 2, 2015, 5 pages.

Patent Cooperation Treaty, "International Preliminary Report on Patentability," issued by the International Bureau in connection with PCT Application No. PCT/US2014/068168, dated Jul. 12, 2015, 1 page.

Braverman, Samantha, "Are the Online Marketing Efforts of TV Shows and Programs Worthwhile?" Mar. 30, 2011, 5 pages.

Danaher, Peter J., "A Canonical Expansion Model for Multivariate Media Exposure Distributions: A Generalization of the Duplication of Viewing Law," Journal of Marketing Research, vol. XXVIII, Aug. 1991, 7 pages.

Enoch, Glenn et al, "Cracking the Cross-Media Code: How to Use Single-Source Measures to Examine Media Cannibalization and Convergence," Journal of Advertising Research, Jun. 2010, 13 pages.

Headen, Robert S. et al,"The Duplication of Viewing Law and Television Media Schedule Evaluation," Journal and Marketing Research, vol. XVI, Aug. 1979, 9 pages.

Huang, Chun-Yao et al., "Modeling the Audience's Banner Ad Exposure for Internet Advertising Planning," Journal of Advertising Research, vol. 35, No. 2, Summer 2006, 15 pages.

Nielsen, "How Teens Use Media: A Nielsen Report on the Myths and Realities of Teen Media Trends," Jun. 2009, 17 pages.

Arbitron Inc., Edison Research, "The Infinite Dial 2011: Navigating Digital Platforms," 2011, 83 pages.

Rust, Roland T. et al, "A Comparative Study of Television Duplication Models," Journal for Advertising, vol. 10, No. 3, 1981, 6 pages.

Edwards, Jim, "Apple Wants More Advertisers to Use Its iPhone Tracking System," Business Insider, Jun. 13, 2013, [http://www.businessinsider.com/apples-idfa-and-ifa-tracking-system-2013-6] retrieved on Jul. 24, 2014, 2 pages.

Face Book for Business, "Measuring Conversions on Facebook, Across Devices and in Mobile Apps,"Aug. 14, 2014, [https://www.facebook.com/business/news/cross-device-measurement] retrieved on Aug. 14, 2014, 3 pages.

Adam et al., "Privacy Preserving Integration of Health Care Data," AMIA 2007 Symposium Proceedings, 6 pages.

Chloe Albanesius, "Facebook Issues Fix for Several Tracking Cookies," internet article, [www.pcmag.com], Sep. 28, 2011, 2 pages.

Emil Protalinski, "Facebook denies cookie tracking allegations," internet article, [www.zdnet.com], Sep. 25, 2011, 2 pages.

Emil Protalinski, "Facebook fixes cookie behavior after logging out," internet article, [www.zdnet.com], Sep. 27, 2011, 2 pages.

Emil Protalinski, "US congressmen ask FTC to investigate Facebook cookies," internet article, [www.zdnet.com], Sep. 28, 2011, 2 pages.

Fliptop, "Fliptop Person API Documentation," [https://developer.fliptop.com/documentation], retrieved on May 7, 2013, 6 pages.

Fliptop, "Get, Keep and Grow Customers with Fliptop's Customer Intelligence Application," [www.fliptop.com/features#social_matching], retrieved on May 7, 2013, 3 pages.

Fliptop, "What is Fliptop?", [www.fliptop.com/about_us], retrieved on May 7, 2013, 1 page.

Javascript and Ajax Forum, Sep. 28, 2005, [http://www.webmasterworld.com/forum91/4465.htm] retrieved on Jun. 29, 2011, 4 pages.

Launder, "Media Journal: Nielsen to Test Online-TV Viewing Tool," The Wall Street Journal, Apr. 30, 2013, 2 pages.

Mental Poker, Wikipedia, Jan. 12, 2010, [http://en.wikipedia.org/wiki/Mental_poker], retrieved on Sep. 21, 2010, 5 pages.

Nielsen Unveils New Online Advertising Measurement, [http://nielsen.com/us/en/insights/pressroom/2010/nielsen_unveils_newonlineadvertisingmeasurement.html] The Nielsen Company, Sep. 27, 2010, retrieved on May 31, 2012, 3 pages.

Nik Cubrilovic, "Logging out of Facebook is not enough," [www.nikcub.appspot.com] Sep. 25, 2011, 3 pages.

(56) References Cited

OTHER PUBLICATIONS

Rapleaf, "Fast. Simple. Secure," [www.rapleaf.com/why-rapleaf/], retrieved on May 7, 2013, 3 pages.
Rapleaf, "Frequently Asked Questions," [www.rapleaf.com/about-us/faq/#where], retrieved on May 7, 2013, 3 pages.
Rapleaf, "The Consumer Data Marketplace," www.rapleaf.com/under-the-hood/, retrieved on May 7, 2013, 2 pages.
Sharma, "Nielsen Gets Digital to Track Online TV Viewers," All Things, Apr. 30, 2013, 3 pages.
Steve Coffey, "Internet Audience Measurement: A Practitioner's View," Journal of Interactive Advertising, vol. 1, No. 2, Spring 2001, 8 pages.
Vega, Tanzina, "Nielsen Introduces New Ad Measurement Product," The New York Times, Sep. 27, 2010, 7 pages.
Vranica, "Nielsen Testing a New Web-Ad Metric," The Wall Street Journal, Sep. 23, 2010, 2 pages.
Hothorn et al. "Unbiased Recursive Partitioning: A Conditional Inference Framework," Journal of Computational and Geographical Statistics, vol. 15, No. 3, 2006, pp. 651-674, 21 pages.
Pouttu-Clarke, Matt, "J2EE patterns: Cross Domain Cookie Provider," [http://www.theserverside.com/discussions/thread/31258.html], The Server Side, Jan. 19, 2005, 12 pages.
Interactive Advertising Bureau, "Interactive Audience Measurement and Advertising Campaign Reporting and Audit Guidelines," Version 6.0b, United States Version, Sep. 2004, 20 pages.
United States Patent and Trademark Office, "Final Office Action," issued in connection with U.S. Appl. No. 14/502,409, dated Mar. 9, 2017, 17 pages.
United States Patent and Trademark Office, "Advisory Action," issued in connection with U.S. Appl. No. 14/502,409, dated May 17, 2017, 5 pages.
United States Patent and Trademark Office, "Final Office Action," issued in connection with U.S. Appl. No. 14/502,409, dated Nov. 16, 2017, 13 pages.
United States Patent and Trademark Office, "Non-Final Office Action," issued in connection with U.S. Appl. No. 14/502,409, dated Jun. 20, 2017, 13 pages.
United States Patent and Trademark Office, "Non-Final Office Action," issued in connection with U.S. Appl. No. 14/502,409, dated Nov. 16, 2016, 22 pages.
United States Patent and Trademark Office, "Notice of Allowance and Fee(s) Due," issued in connection with U.S. Appl. No. 14/502,409, dated Jul. 20, 2018, 15 pages.
United States Patent and Trademark Office, "Non-final Office Action," issued in connection with U.S. Appl. No. 14/528,495, dated Nov. 28, 2016, 34 pages.
United States Patent and Trademark Office, "Final Office Action," issued in connection with U.S. Appl. No. 14/528,495, dated Mar. 23, 2017, 49 pages.
United States Patent and Trademark Office, "Non-final Office Action," issued in connection with U.S. Appl. No. 14/528,495, dated Oct. 6, 2017, 34 pages.
United States Patent and Trademark Office, "Final Office Action," dated Mar. 29, 2018 in connection with U.S. Appl. No. 14/528,495, 40 pages.
United States Patent and Trademark Office, "Advisory Action," dated Jul. 23, 2018 in connection with U.S. Appl. No. 14/528,495, 3 pages.
United States Patent and Trademark Office, "Notice of Panel Decision from Pre-Appeal Brief Review," dated Aug. 13, 2018 in connection with U.S. Appl. No. 14/528,495, 2 pages.
Patent Cooperation Treaty, "International Search Report," issued by the International Searching Authority in connection with PCT Application No. PCT/US2014/068165, dated Feb. 25, 2015, 3 pages.
Patent Cooperation Treaty, "Written Opinion of the International Searching Authority," issued by the International Searching Authority in connection with PCT Application No. PCT/US2014/068165, dated Feb. 25, 2015, 5 pages.
Patent Cooperation Treaty, "International Preliminary Report on Patentability," issued by the International Searching Authority in connection with PCT Application No. PCT/US2014/068165, dated Jul. 12, 2016, 6 page.
United States Patent and Trademark Office, "Non-final Office Action," issued in connection with U.S. Appl. No. 16/146,912, dated May 18, 2020, 20 pages.
United States Patent and Trademark Office, "Notice of Allowance and Fee(s) Due," issued in connection with U.S. Appl. No. 16/146,912, dated Nov. 18, 2020, 10 pages.
United States Patent and Trademark Office, "Notice of Allowance and Fee(s) Due," issued in connection with U.S. Appl. No. 16/146,912, dated Dec. 24, 2020, 2 pages.
Liu, Chuanhai et al., "Broadcast Audience Estimation," 2000 IEEE InfoCom 2000, p. 952-960 (9 pages).
United States Patent and Trademark Office, "Notice of Abandonment," dated Apr. 8, 2019 in connection with U.S. Appl. No. 14/528,495, 2 pages.

\* cited by examiner

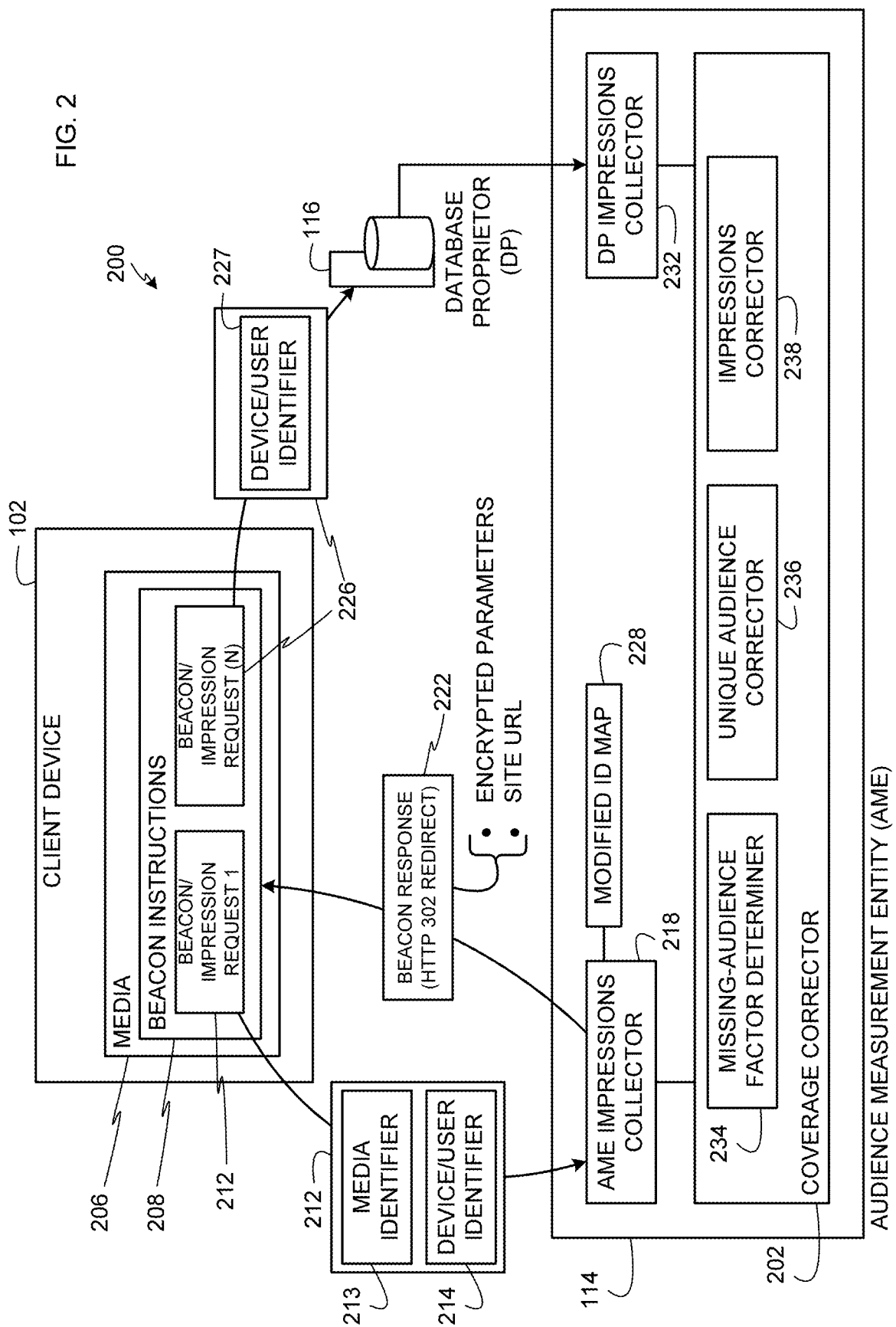

300

| IMP # | PAGE VIEW | AME ID | GENDER | AGE | DP ID |
|---|---|---|---|---|---|
| 1 | GenWeb.com | 1 | M | 24 | 1 |
| 2 | GenMAIL.com | 1 | M | 24 | 1 |
| 3 | GenMAIL.com | 2 | F | 25 | 2 |
| 4 | GenWeb.com | 2 | F | 25 | 3 |
| 5 | GenWeb.com/finance | 3 | F | 60 | 4 |
| 6 | GenWeb.com/news | 4 | M | 61 | 4 |
| 7 | translate.GenWeb.com | 5 | F | 21 | 4 |
| 8 | books.GenWeb.com | 6 | M | 30 | 5 |
| 9 | GenWeb.com | 7 | F | 29 | 6 |
| 10 | GenMAIL.com | 8 | M | 65 | 7 |
| 11 | GenWeb.com | 9 | F | 19 | 8 |
| 12 | GenWeb.com/finance | 9 | F | 19 | 9 |
| 13 | GenWeb.com/news | 9 | F | 19 | 10 |
| 14 | GenWeb.com/finance | 10 | M | 52 | 10 |
| 15 | books.GenWeb.com | 11 | M | 20 | 11 |
| 16 | GenWeb.com/finance | 11 | M | 20 | 12 |
| 17 | GenWeb.com | 11 | M | 20 | 13 |
| 18 | books.GenWeb.com | 12 | F | 51 | 14 |
| 19 | GenWeb.com | 12 | F | 51 | 15 |
| 20 | GenMAIL.com | 12 | F | 51 | 16 |
| 21 | GenWeb.com | 13 | M | 60 | 17 |
| 22 | GenWeb.com/finance | 13 | M | 60 | 18 |
| 23 | GenWeb.com | 14 | F | 66 | - |
| 24 | GenWeb.com/news | 14 | F | 66 | - |
| 25 | GenMAIL.com | 15 | M | 34 | - |
| 26 | GenWeb.com | 16 | F | 33 | - |
| 27 | GenWeb.com/finance | 17 | F | 34 | - |
| 28 | GenWeb.com | 18 | M | 67 | - |

No DP IDs, resulting in non-coverage of database proprietor

IMPRESSIONS TABLE

DATABASE PROPRIETOR AGGREGATE DEMOGRAPHIC IMPRESSION-BASED DATA

400

| DEMOGRAPHIC GROUP (DEMO GP) | DATABASE PROPRIETOR UNIQUE AUDIENCE (DP_UA) — 402 | DATABASE PROPRIETOR IMPRESSIONS (DP_IMP) — 404 | DATABASE PROPRIETOR FREQUENCY (DP_FREQ) — 406 |
|---|---|---|---|
| F<50 | 83,758 | 261,644 | 3.1 |
| F>=50 | 66,949 | 220,054 | 3.3 |
| M<50 | 41,682 | 134,868 | 3.2 |
| M>=50 | 63,827 | 224,194 | 3.5 |
| TOTAL | 256,216 | 840,761 | 3.3 |

FIG. 5

MISSING-AUDIENCE FACTORS

500

| DEMOGRAPHIC GROUP (DEMO GP) | MISSING-AUDIENCE (M-A) FACTOR — 502 |
|---|---|
| F<50 | 67% |
| F>=50 | 50% |
| M<50 | 33% |
| M>=50 | 25% |

FIG. 6

DATABASE PROPRIETOR COVERAGE-CORRECTED IMPRESSION DATA

600

| DEMOGRAPHIC GROUP (DEMO GP) | COVERAGE-CORRECTED UA (CCUA) — 602 | COVERAGE-CORRECTED IMP (CCI) — 604 |
|---|---|---|
| F<50 | 139,597 | 436,074 |
| F>=50 | 100,424 | 330,082 |
| M<50 | 55,576 | 179,824 |
| M>=50 | 74,247 | 260,797 |
| TOTAL | 369,843 | 1,206,776 |

METHODS AND APPARATUS TO CORRECT AUDIENCE MEASUREMENT DATA

RELATED APPLICATION

This application is a continuation of U.S. patent application Ser. No. 14/502,409 filed on Sep. 30, 2014, and claims priority to U.S. Provisional Patent Application Ser. No. 61/923,967 filed on Jan. 6, 2014, which are hereby incorporated herein by reference in their entireties. Priority to U.S. patent application Ser. No. 14/502,409 and U.S. Provisional Patent Application Ser. No. 61/923,967 is claimed.

FIELD OF THE DISCLOSURE

The present disclosure relates generally to monitoring media and, more particularly, to methods and apparatus to correct audience measurement data.

BACKGROUND

Traditionally, audience measurement entities determine audience engagement levels for media based on registered panel members. That is, an audience measurement entity enrolls people who consent to being monitored into a panel. The audience measurement entity then monitors those panel members to determine media (e.g., television programs or radio programs, movies, DVDs, advertisements, streaming media, websites, etc.) exposed to those panel members. In this manner, the audience measurement entity can determine exposure metrics for different media based on the collected media measurement data.

Techniques for monitoring user access to Internet resources such as web pages, advertisements and/or other Internet-accessible media have evolved significantly over the years. Some known systems perform such monitoring primarily through server logs. In particular, entities serving media on the Internet can use known techniques to log the number of requests received for their media (e.g., content and/or advertisements) at their server.

BRIEF DESCRIPTION OF THE DRAWINGS

FIG. 2 illustrates an example communication flow diagram of an example manner in which an audience measurement entity (AME) and a database proprietor (DP) can collect impressions and demographic information based on a client device reporting impressions to the AME and the DP.

FIG. 3 illustrates an example combined impressions table based on impressions collected by the AME and the DP of FIGS. 1 and 2.

FIG. 4 illustrates example demographic-based unique audience, total impressions, and impression frequency data based on impressions collected by the database proprietor of FIGS. 1 and 2 and having inaccuracies due to non-coverage of impressions corresponding to client devices not having device/user identifiers recognizable by the database proprietor.

FIG. 5 illustrates example missing-audience (M-A) factors for different demographic groups.

FIG. 6 illustrates coverage-corrected unique audience values and coverage-corrected impression counts based on the missing-audience factors of FIG. 5.

DETAILED DESCRIPTION

Figure 1:
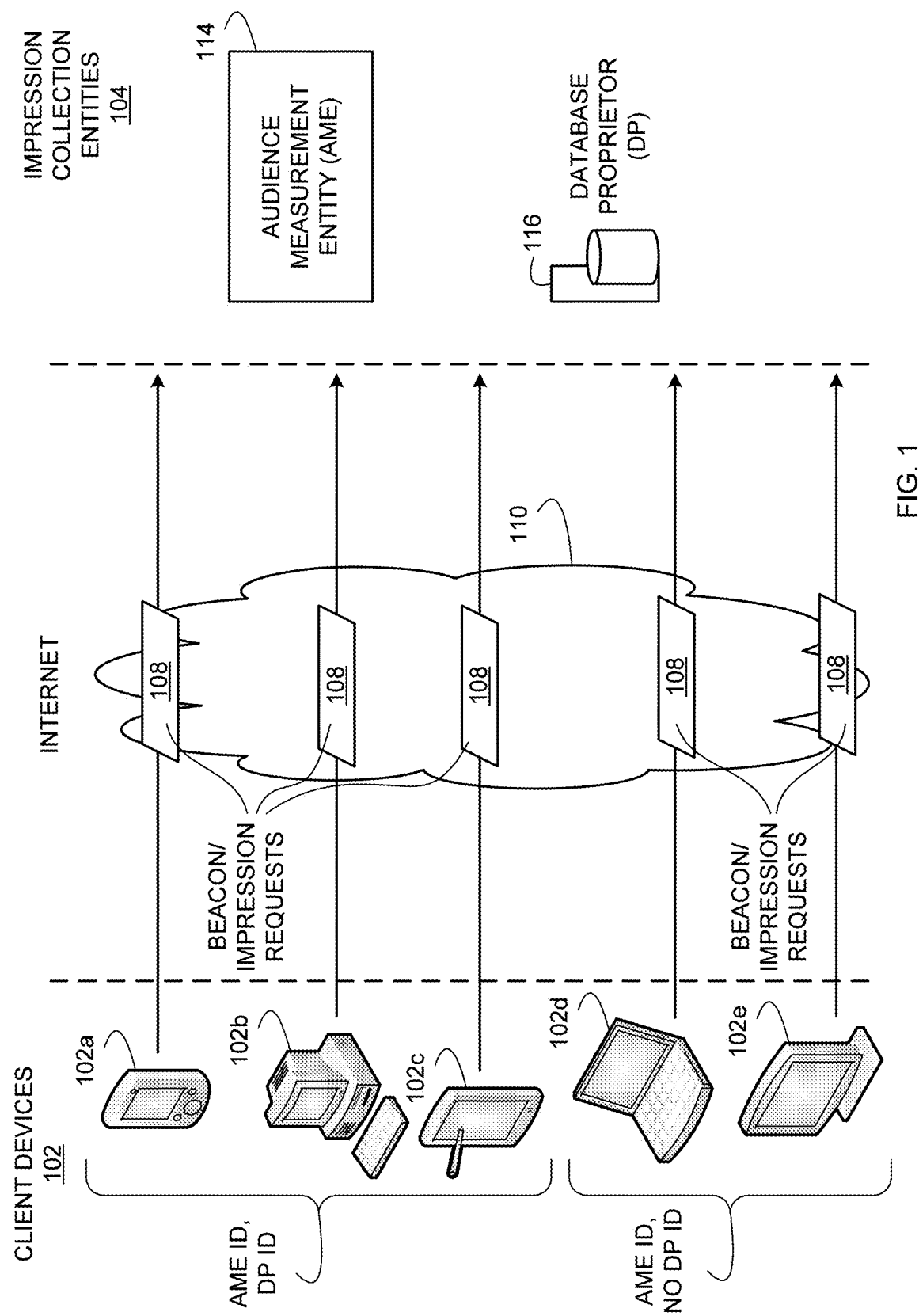
FIG. 1 illustrates example client devices that report audience impressions for internet-based media to impression collection entities to facilitate identifying total impressions and sizes of audiences exposed to different internet-based media.

Techniques for monitoring user access to Internet-accessible media such as web pages, advertisements, content and/or other media have evolved significantly over the years. At one point in the past, such monitoring was done primarily through server logs. In particular, entities serving media on the Internet would log the number of requests received for their media at their server. Basing Internet usage research on server logs is problematic for several reasons. For example, server logs can be tampered with either directly or via zombie programs which repeatedly request media from the server to increase the server log counts. Secondly, media is sometimes retrieved once, cached locally and then repeatedly viewed from the local cache without involving the server in the repeat viewings. Server logs cannot track these repeat views of cached media. Thus, server logs are susceptible to both over-counting and under-counting errors.

The inventions disclosed in Blumenau, U.S. Pat. No. 6,108,637, fundamentally changed the way Internet monitoring is performed and overcame the limitations of the server side log monitoring techniques described above. For example, Blumenau disclosed a technique wherein Internet media to be tracked is tagged with beacon instructions. In particular, monitoring instructions are associated with the hypertext markup language (HTML) of the media to be tracked. When a client requests the media, both the media and the beacon instructions are downloaded to the client. The beacon instructions are, thus, executed whenever the media is accessed, be it from a server or from a cache.

The beacon instructions cause monitoring data reflecting information about the access to the media to be sent from the client that downloaded the media to a monitoring entity. Typically, the monitoring entity is an audience measurement entity (AME) that did not provide the media to the client and who is a trusted (e.g., neutral) third party for providing accurate usage statistics (e.g., The Nielsen Company, LLC). Advantageously, because the beaconing instructions are associated with the media and executed by the client browser whenever the media is accessed, the monitoring information is provided to the AME irrespective of whether the client is a panelist of the AME.

Audience measurement entities and/or other businesses often desire to link demographics to the monitoring information. To address this issue, the AME establishes a panel of users who have agreed to provide their demographic information and to have their Internet browsing activities monitored. When an individual joins the panel, they provide detailed information concerning their identity and demographics (e.g., gender, age, ethnicity, income, home location, occupation, etc.) to the AME. The audience measurement entity sets a cookie on the panelist computer that enables the audience measurement entity to identify the panelist whenever the panelist accesses tagged media and, thus, sends monitoring information to the audience measurement entity.

Since most of the clients providing monitoring information from the tagged media are not panelists and, thus, are unknown to the audience measurement entity, it is necessary to use statistical methods to impute demographic information based on the data collected for panelists to the larger population of users providing data for the tagged media. However, panel sizes of audience measurement entities remain small compared to the general population of users. Thus, a problem is presented as to how to increase panel sizes while ensuring the demographics data of the panel is accurate.

There are many database proprietors operating on the Internet. These database proprietors provide services to large numbers of subscribers. In exchange for the provision of the service, the subscribers register with the proprietor. As part of this registration, the subscribers provide detailed demographic information. Examples of such database proprietors include social network providers, email providers, etc. such as Facebook, Myspace, Twitter, Yahoo!, Google, etc. These database proprietors set cookies or other device/user identifiers on the client devices of their subscribers to enable the database proprietor to recognize the user when they visit their website.

The protocols of the Internet make cookies inaccessible outside of the domain (e.g., Internet domain, domain name, etc.) on which they were set. Thus, a cookie set in, for example, the amazon.com domain is accessible to servers in the amazon.com domain, but not to servers outside that domain. Therefore, although an audience measurement entity might find it advantageous to access the cookies set by the database proprietors, they are unable to do so.

The inventions disclosed in Mainak et al., U.S. Pat. No. 8,370,489, which is incorporated by reference herein in its entirety, enable an audience measurement entity to leverage the existing databases of database proprietors to collect more extensive Internet usage and demographic data by extending the beaconing process to encompass partnered database proprietors and by using such partners as interim data collectors. The inventions disclosed in Mainak et al. accomplish this task by structuring the AME to respond to beacon requests from clients (who may not be a member of an audience member panel and, thus, may be unknown to the audience member entity) and redirect the client from the audience measurement entity to a database proprietor such as a social network site partnered with the audience member entity. The redirection initiates a communication session between the client accessing the tagged media and the database proprietor. The database proprietor (e.g., Facebook) can access any cookie it has set on the client to thereby identify the client based on the internal records of the database proprietor. In the event the client corresponds to a subscriber of the database proprietor, the database proprietor logs an impression in association with the demographics data associated with the client and subsequently forwards logged impressions to the audience measurement company. In the event the client does not correspond to a subscriber of the database proprietor, the database proprietor may redirect the client to the audience measurement entity and/or another database proprietor. The audience measurement entity may respond to the redirection from the first database proprietor by redirecting the client to a second, different database proprietor that is partnered with the audience measurement entity. That second database proprietor may then attempt to identify the client as explained above. This process of redirecting the client from database proprietor to database proprietor can be performed any number of times until the client is identified and the content exposure logged, or until all database partners have been contacted without a successful identification of the client. The redirections all occur automatically so the user of the client is not involved in the various communication sessions and may not even know they are occurring.

Periodically or aperiodically, the partnered database proprietors provide their logs and demographic information to the audience measurement entity which then compiles the collected data into statistical reports accurately identifying the demographics of persons accessing the tagged media. Because the identification of clients is done with reference to enormous databases of users far beyond the quantity of persons present in a conventional audience measurement panel, the data developed from this process is extremely accurate, reliable and detailed.

Significantly, because the audience measurement entity remains the first leg of the data collection process (e.g., receives the request generated by the beacon instructions from the client), the audience measurement entity is able to obscure the source of the media access being logged as well as the identity of the media itself from the database proprietors (thereby protecting the privacy of the media sources), without compromising the ability of the database proprietors to log impressions for their subscribers. Further, when cookies are used as device/user identifiers, the Internet security cookie protocols are complied with because the only servers that access a given cookie are associated with the Internet domain (e.g., Facebook.com) that set that cookie.

Examples disclosed in Mainak et al. (U.S. Pat. No. 8,370,489) can be used to determine any type of media impressions or exposures (e.g., content impressions, advertisement impressions, content exposure, and/or advertisement exposure) using demographic information, which is distributed across different databases (e.g., different website owners, service providers, etc.) on the Internet. Not only do such disclosed examples enable more accurate correlation of Internet advertisement exposure to demographics, but they also effectively extend panel sizes and compositions beyond persons participating in the panel of an audience measurement entity and/or a ratings entity to persons registered in other Internet databases such as the databases of social media sites such as Facebook, Twitter, Google, etc. Such extension effectively leverages the media tagging capabilities of the ratings entity and the use of databases of non-ratings entities such as social media and other websites to create an enormous, demographically accurate panel that results in accurate, reliable measurements of exposures to Internet media such as advertising and/or programming.

Traditionally, audience measurement entities (also referred to herein as "ratings entities") determine demographic reach for advertising and media programming based on registered panel members. That is, an audience measurement entity enrolls people that consent to being monitored into a panel. During enrollment, the audience measurement entity receives demographic information from the enrolling people so that subsequent correlations may be made between advertisement/media exposures to those panelists and different demographic markets. Unlike traditional techniques in which audience measurement entities rely solely on their own panel member data to collect demographics-based audience measurements, example methods, apparatus, and/or articles of manufacture disclosed herein enable an audience measurement entity to share demographic information with other entities that operate based on user registration models. As used herein, a user registration model is a model in which users subscribe to services of those entities by creating an account and providing demographic-related information about themselves. Sharing of demographic information associated with registered users of database proprietors enables an audience measurement entity to extend or supplement their panel data with substantially reliable demographics information from external sources (e.g., database proprietors), thus extending the coverage, accuracy, and/or completeness of audience measurement entity's demographics-based audience measurements. Such access also enables the audience measurement entity to monitor persons who would not otherwise have joined an audience measurement panel. Any entity having a network-accessible database identifying demographics of a set of individuals may cooperate with the audience measurement entity. Such entities may be referred to as "database proprietors" and include entities such as Facebook, Google, Yahoo!, MSN, Twitter, Apple iTunes, Experian, etc.

To increase the likelihood that measured viewership is accurately attributed to the correct demographics, examples disclosed herein use demographic information located in the audience measurement entity's records as well as demographic information located at one or more database proprietors that maintain records or profiles of users having accounts therewith. In this manner, examples disclosed herein may be used to supplement demographic information maintained by a ratings entity (e.g., an AME such as The Nielsen Company of Schaumburg, Ill., United States of America, that collects media exposure measurements and/or demographics) with demographic information from one or more different database proprietors.

The use of demographic information from disparate data sources (e.g., high-quality demographic information from the panels of an audience measurement company and/or registered user data of web service providers) results in improved reporting effectiveness of metrics for both online and offline advertising campaigns. Example techniques disclosed herein use online registration data to identify demographics of users and use server impression counts, tagging (also referred to herein as beaconing), and/or other techniques to track quantities of impressions attributable to those users. Online web service providers such as social networking sites (e.g., Facebook) and multi-service providers (e.g., Yahoo!, Google, Experian, etc.) (collectively and individually referred to herein as database proprietors) maintain detailed demographic information (e.g., age, gender, geographic location, race, income level, education level, religion, etc.) collected via user registration processes. As used herein, an impression is defined to be an event in which a home or individual is exposed to corresponding media (e.g., content and/or an advertisement). Thus, an impression represents a home or an individual having been exposed to media (e.g., an advertisement, content, a group of advertisements and/or a collection of content). In Internet advertising, a quantity of impressions or impression count is the total number of times media (e.g., content, an advertisement or advertisement campaign) has been accessed by a web population (e.g., the number of times the media is accessed). As used herein, a demographic impression is defined to be an impression that is associated with a characteristic (e.g., a demographic characteristic) of the person exposed to the media.

Although such techniques for collecting media impressions are based on highly accurate demographic information, in some instances impressions collected by a database proprietor (e.g., Facebook, Yahoo, Google, etc.) may be inaccurate and/or incomplete when the database proprietor does not have complete coverage of device/user identifiers (e.g., cookies) at all of the client devices that visit a site of the database proprietor. As used herein in this context, coverage represents the extent to which a database proprietor has set device/user identifiers in client devices that visit the site of the database proprietor. For example, if only 50% of client devices that visit the site of the database proprietor have a cookie set therein by the database proprietor, then the database proprietor has 50% coverage of client devices that visit its site. A client device may not have a cookie set by the database proprietor in its web browser if, for example, a user doesn't have an account with the database proprietor or if the user has an account with the database proprietor but has cleared the cookie cache and deleted the database proprietor's cookie before or at the time of a media exposure. In such instances, the database proprietor would not be able to detect the media exposure and, thus, would not report any audience or impressions for that exposure. As a result, the database proprietor would underestimate the reach and gross rating points (GRPs) of a campaign.

As used herein, reach is a measure indicative of the demographic coverage achieved by media such as content or an ad campaign (e.g., demographic group(s) and/or demographic population(s) exposed to the media). For example, an ad campaign reaching a broader demographic base will have a larger reach than an ad campaign that reached a more limited demographic base. The reach metric may be measured by tracking media impressions for known users (e.g., panelists or non-panelists) for which an AME stores demographic information or can obtain demographic information (e.g., via a database proprietor).

In illustrated examples disclosed herein, media exposure is measured in terms of online Gross Rating Points. A Gross Rating Point (GRP) is a unit of measurement of audience size that has traditionally been used in the television ratings context. It is used to measure exposure to one or more media (e.g., programs, advertisements, etc.) without regard to multiple exposures of the same media to individuals. In terms of television (TV) advertisements, one GRP is equal to 1% of TV households. While GRPs have traditionally been used as a measure of television viewership, examples disclosed herein may be used in connection with generating online GRPs for online media to provide a standardized metric that can be used across the Internet to accurately reflect online advertisement exposure. Such standardized online GRP measurements can provide greater certainty to advertisers that their online advertisement money is well spent. It can also facilitate cross-medium comparisons such as viewership of TV advertisements and online advertisements, exposure to radio advertisements and online media, etc. Because examples disclosed herein may be used to correct impressions that associate exposure measurements with corresponding demographics of users, the information processed using examples disclosed herein may also be used by advertisers to more accurately identify markets reached by their advertisements and/or to target particular markets with future advertisements.

Examples disclosed herein may be implemented by an audience measurement entity (AME) (e.g., any entity interested in measuring or tracking audience exposures to advertisements, content, and/or any other media) in cooperation with any number of database proprietors such as online web services providers. Such database proprietors/online web services providers may be social network sites (e.g., Facebook, Twitter, MySpace, etc.), multi-service sites (e.g., Yahoo!, Google, Axiom, Catalina, etc.), online retailer sites (e.g., Amazon.com, Buy.com, etc.), credit reporting sites (e.g., Experian) and/or any other web service(s) site that maintains user registration records.

Example processes to adjust impressions collected by database proprietors having limited coverage of cookies are disclosed herein. In some examples, profile correction (e.g., a current Decision Tree (DT) model) is applied to impression data collected by database proprietors. In the illustrated examples, using a panel of registered audience members, an AME calculates missing-adjustment (M-A) factors for each website and demographic group using, for example, three months of historical data. However, any other amount of historical data may be used. In some examples, the AME panel of registered audience members may be a cross-platform home television/computer panel (e.g., a TVPC panel). In other examples, the AME panel of registered users may be a computer panel or internet-device panel without corresponding to a television audience panel. In other examples, the AME panel may be a cross-platform radio/internet panel, and/or a panel focusing on other mediums.

In examples disclosed herein, the AME determines missing-audience (M-A) factors using historical impression data and subsequently applies the M-A factors to impression data collected by a database proprietor in order to compensate the database proprietor impressions for the database proprietor's non-coverage due to not having database proprietor device/user identifiers set on some client devices. In examples disclosed herein, the AME panel includes audience members recruited by the AME. When recruited into the AME panel, the AME collects demographic information from the enrolled panelist audience members so that the AME can correlate demographics with exposures to online media. In some examples, the AME also uses the AME panel demographics data to correlate the demographics with media exposures (e.g., television exposures, radio exposures, etc.). In some examples, the AME uses particular techniques when collecting panelist demographic information to ensure that the demographic information is highly accurate. In this manner, demographic-based impression data generated by the AME can accurately reflect demographics that correspond to impressions for particular media.

Example methods and computer readable instructions disclosed herein may be used to determine a missing-audience factor based on a first quantity of impressions corresponding to first client devices that do not have database proprietor identifiers for use by a database proprietor to identify subscribers registered with the database proprietor, and based on a second quantity of impressions corresponding to second client devices that do have the database proprietor identifiers for use by the database proprietor to identify subscribers registered with the database proprietor. In such examples, the first quantity of impressions is representative of accesses to media via the first client devices, and the second quantity of impressions is representative of access to the media via the second client devices. In such examples, a coverage-corrected unique audience size may be determined based on the missing-audience factor and a unique audience size of database proprietor subscribers exposed to the media. In such examples, the unique audience size is determined based on a quantity of impressions logged by the database proprietor. In such examples, the coverage-corrected unique audience size corresponds to the quantity of impressions logged by the database proprietor and a quantity of impressions not logged by the database proprietor. In some examples, the missing-audience factor and the coverage-corrected unique audience size are determined by an audience measurement entity separate from the database proprietor. In some examples, the database proprietor is at least one of a social network service provider or an email service provider.

In some examples, a coverage-corrected impression count is determined based on the coverage-corrected unique audience size and an impressions frequency. In such some examples, the coverage-corrected impression count is representative of the quantity of impressions logged by the database proprietor and the quantity of impressions not logged by the database proprietor. In some examples, the impressions frequency is the quantity of impressions logged by the database proprietor divided by the unique audience size of database proprietor subscribers.

In some examples, the missing-audience factor is determined by dividing the first quantity of impressions corresponding to the first client devices that do not have the database proprietor identifiers by the second quantity of impressions corresponding to the second client devices that do have the database proprietor identifiers. In some examples, the missing-audience factor and the coverage-corrected unique audience size are determined based on impressions logged by the database proprietor for a particular demographic group identified by the database proprietor.

In some examples, the impressions are collected by responding to beacon requests from client devices by redirecting the client devices to communicate with the database proprietor to enable the database proprietor to record the impressions. In some such examples, the client devices are instructed to provide an identifier (e.g., a device/user identifier 227 of FIG. 2) to the database proprietor. In such examples, the identifier does not identify the media or a source of the media.

Example apparatus disclosed herein may include a missing-audience factor determiner to determine a missing-audience factor based on a first quantity of impressions corresponding to first client devices that do not have database proprietor identifiers for use by a database proprietor to identify subscribers registered with the database proprietor, and based on a second quantity of impressions corresponding to second client devices that do have the database proprietor identifiers for use by the database proprietor to identify subscribers registered with the database proprietor. The first quantity of impressions is representative of accesses to media via the first client devices. The second quantity of impressions is representative of accesses to the media via the second client devices. Disclosed example apparatus may also include a unique audience size corrector to determine a coverage-corrected unique audience size based on the missing-audience factor and a unique audience size of database proprietor subscribers exposed to the media. In such examples, the unique audience size is determined based on a quantity of impressions logged by the database proprietor. In such examples, the coverage-corrected unique audience size corresponds to the quantity of impressions logged by the database proprietor and a quantity of impressions not logged by the database proprietor. In some examples, the missing-audience factor determiner and the unique audience corrector are operated by an audience measurement entity separate from the database proprietor. In some examples, the database proprietor is at least one of a social network service provider or an email service provider.

Some example apparatus also include an impressions corrector to determine a coverage-corrected impression count based on the coverage-corrected unique audience size and an impressions frequency. In such some examples, the coverage-corrected impression count is representative of the quantity of impressions logged by the database proprietor and the quantity of impressions not logged by the database proprietor. In some examples, the impressions frequency is the quantity of impressions logged by the database proprietor divided by the unique audience size of database proprietor subscribers.

In some example apparatus, the missing-audience factor determiner determines the missing-audience factor by dividing the first quantity of impressions corresponding to the first client devices that do not have the database proprietor identifiers by the second quantity of impressions corresponding to the second client devices that do have the database proprietor identifiers. In some example apparatus, the missing-audience factor determiner determines the missing-audience factor and the unique audience corrector determines the coverage-corrected unique audience size based on impressions logged by the database proprietor for a particular demographic group identified by the database proprietor.

Some example apparatus also include an impressions collector to collect the impressions by responding to beacon requests from client devices to redirect the client devices to communicate with the database proprietor to enable the database proprietor to record the impressions. In such some examples, the impressions collector instructs the client devices to provide an identifier (e.g., a device/user identifier 227 of FIG. 2) to the database proprietor. In such examples, the identifier does not identify the media or a source of the media.

FIG. 1 illustrates example client devices 102 that report audience impressions for internet-based media to impression collection entities 104 to facilitate identifying total impressions and sizes of audiences exposed to different internet-based media. As used herein, the term impression collection entity refers to any entity that collects impression data such as, for example, AMEs and database proprietors that collect impression data. The client devices 102 of the illustrated example may be any device capable of accessing media over a network. For example, the client devices 102 may be a computer, a tablet, a mobile device, a smart television, or any other Internet-capable device or appliance. Examples disclosed herein may be used to collect impression information for any type of media including content and/or advertisements. Media may include advertising and/or content delivered via web pages, streaming video, streaming audio, internet protocol television (IPTV), movies, television, radio and/or any other vehicle for delivering media. In some examples, media includes user-generated media that is, for example, uploaded to media upload sites such as YouTube and subsequently downloaded and/or streamed by one or more other client devices for playback. Media may also include advertisements. Advertisements are typically distributed with content (e.g., programming). Traditionally, content is provided at little or no cost to the audience because it is subsidized by advertisers that pay to have their advertisements distributed with the content. As used herein, "media" refers collectively and/or individually to content and/or advertisement(s).

In the illustrated example, the client devices 102 employ web browsers and/or applications (e.g., apps) to access media, some of which include instructions that cause the client devices 102 to report media monitoring information to one or more of the impression collection entities 104. That is, when a client device 102 of the illustrated example accesses media, a web browser and/or application of the client device 102 executes instructions in the media to send a beacon request or impression request 108 to one or more impression collection entities 104 via, for example, the Internet 110. The beacon requests 108 of the illustrated example include information about accesses to media at the corresponding client device 102 generating the beacon requests. Such beacon requests allow monitoring entities, such as the impression collection entities 104, to collect impressions for different media accessed via the client devices 102. In this manner, the impression collection entities 104 can generate large impression quantities for different media (e.g., different content and/or advertisement campaigns).

The impression collection entities 104 of the illustrated example include an example audience measurement entity (AME) 114 and an example database proprietor (DP) 116. In the illustrated example, the AME 114 does not provide the media to the client devices 102 and is a trusted (e.g., neutral) third party (e.g., The Nielsen Company, LLC) for providing accurate media access statistics. In the illustrated example, the database proprietor 116 is one of many database proprietors that operates on the Internet to provide services to large numbers of subscribers. Such services may be email services, social networking services, news media services, cloud storage services, streaming music services, streaming video services, online retail shopping services, credit monitoring services, etc. Example database proprietors include social network sites (e.g., Facebook, Twitter, MySpace, etc.), multi-service sites (e.g., Yahoo!, Google, etc.), online retailer sites (e.g., Amazon.com, Buy.com, etc.), credit services (e.g., Experian), and/or any other web service(s) site that maintains user registration records. In examples disclosed herein, the database proprietor 116 maintains user account records corresponding to users registered for Internet-based services provided by the database proprietors. That is, in exchange for the provision of services, subscribers register with the database proprietor 116. As part of this registration, the subscribers provide detailed demographic information to the database proprietor 116. Demographic information may include, for example, gender, age, ethnicity, income, home location, education level, occupation, etc. In the illustrated example, the database proprietor 116 sets a device/user identifier (e.g., an identifier described below in connection with FIG. 2) on a subscriber's client device 102 that enables the database proprietor 116 to identify the subscriber.

In the illustrated example, when the database proprietor 116 receives a beacon/impression request 108 from a client device 102, the database proprietor 116 requests the client device 102 to provide the device/user identifier that the database proprietor 116 had previously set for the client device 102. The database proprietor 116 uses the device/user identifier corresponding to the client device 102 to identify demographic information in its user account records corresponding to the subscriber of the client device 102. In this manner, the database proprietor 116 can generate demographic impressions by associating demographic information with an audience impression for the media accessed at the client device 102. As explained above, a demographic impression is an impression that is associated with a characteristic (e.g., a demographic characteristic) of the person exposed to the media.

In the illustrated example, the AME 114 establishes a panel of users who have agreed to provide their demographic information and to have their Internet browsing activities monitored. When an individual joins the AME panel, the person provides detailed information concerning the person's identity and demographics (e.g., gender, age, ethnicity, income, home location, occupation, etc.) to the AME 114. The AME 114 sets a device/user identifier (e.g., an identifier described below in connection with FIG. 2) on the person's client device 102 that enables the AME 114 to identify the panelist.

In the illustrated example, when the AME 114 receives a beacon request 108 from a client device 102, the AME 114 requests the client device 102 to provide the AME 114 with the device/user identifier the AME 114 previously set for the client device 102. The AME 114 uses the device/user identifier corresponding to the client device 102 to identify demographic information in its user AME panelist records corresponding to the panelist of the client device 102. In this manner, the AME 114 can generate demographic impressions by associating demographic information with an audience impression for the media accessed at the client device 102.

In the illustrated example, three of the client devices 102a, 102b, 102c have AME identifiers (IDs) (AME device/user IDs) that identify corresponding panelists of the AME 114 and also have DP IDs (DP device/user IDs) that identify corresponding subscribers of the database proprietor 116. In this manner, when the client devices 102a, 102b, 102c corresponding to both AME panelists and DP subscribers send beacon requests 108 to the impression collection entities 104, both the AME 114 and the database proprietor 116 can log demographic impressions. (Although for simplicity of illustration, the signaling is not shown in FIG. 1, it is understood that the client devices 102a, 102b, 102c (and/or any other client device) may communicate with the AME 114 and/or the database proprietor 116 using the redirection mechanism disclosed in Mainak et al., U.S. Pat. No. 8,370,489, as described above.) In the illustrated example, the client devices 102d, 102e have AME IDs but do not have DP IDs. As such, the database proprietor 116 is unable to identify the client devices 102d, 102e due to those client devices not having DP IDs set by the database proprietor 116. The client devices 102d, 102e may not have DP IDs set by the database proprietor 116 if, for example, the client devices 102d, 102e do not accept cookies, a user doesn't have an account with the database proprietor 116 or if the user has an account with the database proprietor 116 but has cleared the DP ID (e.g., cleared a cookie cache) and deleted the database proprietor's DP ID before or at the time of a media exposure. In such instances, if the user device 102 is, for example, redirected to contact the database proprietor 116 using the system disclosed in Mainak et al., U.S. Pat. No. 8,370,489, the database proprietor 116 is not able to detect demographics corresponding to the media exposure and, thus, does not report any audience or impressions for that exposure. In examples disclosed herein, the client devices 102d, 102e are referred to herein as client devices over which the database proprietor 116 has non-coverage because the database proprietor 116 is unable to identify demographics corresponding to those client devices 102d, 102e. As a result of the non-coverage, the database proprietor 116 underestimates the audience size and number of impressions for corresponding media accessed via the client devices 102 when, for example, operating within the system of Mainak et al., U.S. Pat. No. 8,370,489.

FIG. 2 is an example communication flow diagram 200 of an example manner in which the AME 114 and the DP 116 can collect demographic impressions based on client devices 102 reporting impressions to the AME 114 and the DP 116. FIG. 2 also shows an example coverage corrector 202 to correct unique audience sizes and impression counts for impressions reported by client devices 102 and for which the database proprietor 116 has non-coverage of identifiable DP IDs on one or more of those client devices 102. The example chain of events shown in FIG. 2 occurs when a client device 102 accesses media for which the client device 102 reports an impression to the AME 114 and the database proprietor 116. In some examples, the client device 102 reports impressions for accessed media based on instructions (e.g., beacon instructions) embedded in the media that instruct the client device 102 (e.g., instruct a web browser or an app in the client device 102) to send beacon/impression requests (e.g., the beacon/impression requests 108 of FIG. 1) to the AME 114 and/or the database proprietor 116. In such examples, the media having the beacon instructions is referred to as tagged media. In other examples, the client device 102 reports impressions for accessed media based on instructions embedded in apps or web browsers that execute on the client device 102 to send beacon/impression requests (e.g., the beacon/impression requests 108 of FIG. 1) to the AME 114 and/or the database proprietor 116 for corresponding media accessed via those apps or web browsers. In any case, the beacon/impression requests (e.g., the beacon/impression requests 108 of FIG. 1) include device/user identifiers (e.g., AME IDs and/or DP IDs) as described further below to allow the corresponding AME 114 and/or the corresponding database proprietor 116 to associate demographic information with resulting logged impressions.

In the illustrated example, the client device 102 accesses media 206 that is tagged with the beacon instructions 208. The beacon instructions 208 cause the client device 102 to send a beacon/impression request 212 to an AME impressions collector 218 when the client device 102 accesses the media 206. For example, a web browser and/or app of the client device 102 executes the beacon instructions 208 in the media 206 which instruct the browser and/or app to generate and send the beacon/impression request 212. In the illustrated example, the client device 102 sends the beacon/impression request 212 using an HTTP (hypertext transfer protocol) request addressed to the URL (uniform resource locator) of the AME impressions collector 218 at, for example, a first internet domain of the AME 114. The beacon/impression request 212 of the illustrated example includes a media identifier 213 (e.g., an identifier that can be used to identify content, an advertisement, and/or any other media) corresponding to the media 206. In some examples, the beacon/impression request 212 also includes a site identifier (e.g., a URL) of the website that served the media 206 to the client device 102 and/or a host website ID (e.g., www.acme.com) of the website that displays or presents the media 206. In the illustrated example, the beacon/impression request 212 includes a device/user identifier 214. In the illustrated example, the device/user identifier 214 that the client device 102 provides to the AME impressions collector 218 in the beacon impression request 212 is an AME ID because it corresponds to an identifier that the AME 114 uses to identify a panelist corresponding to the client device 102. In other examples, the client device 102 may not send the device/user identifier 214 until the client device 102 receives a request for the same from a server of the AME 114 in response to, for example, the AME impressions collector 218 receiving the beacon/impression request 212.

In some examples, the device/user identifier 214 may be a device identifier (e.g., an international mobile equipment identity (IMEI), a mobile equipment identifier (MEID), a media access control (MAC) address, etc.), a web browser unique identifier (e.g., a cookie), a user identifier (e.g., a user name, a login ID, etc.), an Adobe Flash® client identifier, identification information stored in an HTML5 datastore, and/or any other identifier that the AME 114 stores in association with demographic information about users of the client devices 102. In this manner, when the AME 114 receives the device/user identifier 214, the AME 114 can obtain demographic information corresponding to a user of the client device 102 based on the device/user identifier 214 that the AME 114 receives from the client device 102. In some examples, the device/user identifier 214 may be encrypted (e.g., hashed) at the client device 102 so that only an intended final recipient of the device/user identifier 214 can decrypt the hashed identifier 214. For example, if the device/user identifier 214 is a cookie that is set in the client device 102 by the AME 114, the device/user identifier 214 can be hashed so that only the AME 114 can decrypt the device/user identifier 214. If the device/user identifier 214 is an IMEI number, the client device 102 can hash the device/user identifier 214 so that only a wireless carrier (e.g., the database proprietor 116) can decrypt the hashed identifier 214 to recover the NEI for use in accessing demographic information corresponding to the user of the client device 102. By hashing the device/user identifier 214, an intermediate party (e.g., an intermediate server or entity on the Internet) receiving the beacon request cannot directly identify a user of the client device 102.

In response to receiving the beacon/impression request 212, the AME impressions collector 218 logs an impression for the media 206 by storing the media identifier 213 contained in the beacon/impression request 212. In the illustrated example of FIG. 2, the AME impressions collector 218 also uses the device/user identifier 214 in the beacon/impression request 212 to identify AME panelist demographic information corresponding to a panelist of the client device 102. That is, the device/user identifier 214 matches a user ID of a panelist member (e.g., a panelist corresponding to a panelist profile maintained and/or stored by the AME 114). In this manner, the AME impressions collector 218 can associate the logged impression with demographic information of a panelist corresponding to the client device 102.

In some examples, the beacon/impression request 212 may not include the device/user identifier 214 if, for example, the user of the client device 102 is not an AME panelist. In such examples, the AME impressions collector 218 logs impressions regardless of whether the client device 102 provides the device/user identifier 214 in the beacon/impression request 212 (or in response to a request for the identifier 214). When the client device 102 does not provide the device/user identifier 214, the AME impressions collector 218 will still benefit from logging an impression for the media 206 even though it will not have corresponding demographics. For example, the AME 114 may still use the logged impression to generate a total impressions count and/or a frequency of impressions (e.g., an impressions frequency) for the media 206. Additionally or alternatively, the AME 114 may obtain demographics information from the database proprietor 116 for the logged impression if the client device 102 corresponds to a subscriber of the database proprietor 116.

In the illustrated example of FIG. 2, to compare or supplement panelist demographics (e.g., for accuracy or completeness) of the AME 114 with demographics from one or more database proprietors (e.g., the database proprietor 116), the AME impressions collector 218 returns a beacon response message 222 (e.g., a first beacon response) to the client device 102 including an HTTP "302 Found" re-direct message and a URL of a participating database proprietor 116 at, for example, a second internet domain. In the illustrated example, the HTTP "302 Found" re-direct message in the beacon response 222 instructs the client device 102 to send a second beacon request 226 to the database proprietor 116. In other examples, instead of using an HTTP "302 Found" re-direct message, redirects may be implemented using, for example, an iframe source instruction (e.g., <iframe src=" ">) or any other instruction that can instruct a client device to send a subsequent beacon request (e.g., the second beacon request 226) to a participating database proprietor 116. In the illustrated example, the AME impressions collector 218 determines the database proprietor 116 specified in the beacon response 222 using a rule and/or any other suitable type of selection criteria or process. In some examples, the AME impressions collector 218 determines a particular database proprietor to which to redirect a beacon request based on, for example, empirical data indicative of which database proprietor is most likely to have demographic data for a user corresponding to the device/user identifier 214. In some examples, the beacon instructions 208 include a predefined URL of one or more database proprietors to which the client device 102 should send follow up beacon requests 226. In other examples, the same database proprietor is always identified in the first redirect message (e.g., the beacon response 222).

In the illustrated example of FIG. 2, the beacon/impression request 226 may include a device/user identifier 227 that is a DP ID because it is used by the database proprietor 116 to identify a subscriber of the client device 102 when logging an impression. In some instances (e.g., in which the database proprietor 116 has not yet set a DP ID in the client device 102), the beacon/impression request 226 does not include the device/user identifier 227. In some examples, the DP ID is not sent until the database proprietor 116 requests the same (e.g., in response to the beacon/impression request 226). In some examples, the device/user identifier 227 is a device identifier (e.g., an international mobile equipment identity (IMEI), a mobile equipment identifier (MEID), a media access control (MAC) address, etc.), a web browser unique identifier (e.g., a cookie), a user identifier (e.g., a user name, a login ID, etc.), an Adobe Flash® client identifier, identification information stored in an HTML5 datastore, and/or any other identifier that the database proprietor 116 stores in association with demographic information about subscribers corresponding to the client devices 102. When the database proprietor 116 receives the device/user identifier 227, the database proprietor 116 can obtain demographic information corresponding to a user of the client device 102 based on the device/user identifier 227 that the database proprietor 116 receives from the client device 102. In some examples, the device/user identifier 227 may be encrypted (e.g., hashed) at the client device 102 so that only an intended final recipient of the device/user identifier 227 can decrypt the hashed identifier 227. For example, if the device/user identifier 227 is a cookie that is set in the client device 102 by the database proprietor 116, the device/user identifier 227 can be hashed so that only the database proprietor 116 can decrypt the device/user identifier 227. If the device/user identifier 227 is an IMEI number, the client device 102 can hash the device/user identifier 227 so that only a wireless carrier (e.g., the database proprietor 116) can decrypt the hashed identifier 227 to recover the IMEI for use in accessing demographic information corresponding to the user of the client device 102. By hashing the device/user identifier 227, an intermediate party (e.g., an intermediate server or entity on the Internet) receiving the beacon request cannot directly identify a user of the client device 102. For example, if the intended final recipient of the device/user identifier 227 is the database proprietor 116, the AME 114 cannot recover identifier information when the device/user identifier 227 is hashed by the client device 102 for decrypting only by the intended database proprietor 116.

Although only a single database proprietor 116 is shown in FIGS. 1 and 2, the impression reporting/collection process of FIGS. 1 and 2 may be implemented using multiple database proprietors. In some such examples, the beacon instructions 208 cause the client device 102 to send beacon/impression requests 226 to numerous database proprietors. For example, the beacon instructions 208 may cause the client device 102 to send the beacon/impression requests 226 to the numerous database proprietors in parallel or in daisy chain fashion. In some such examples, the beacon instructions 208 cause the client device 102 to stop sending beacon/impression requests 226 to database proprietors once a database proprietor has recognized the client device 102. In other examples, the beacon instructions 208 cause the client device 102 to send beacon/impression requests 226 to database proprietors so that multiple database proprietors can recognize the client device 102 and log a corresponding impression. In any case, multiple database proprietors are provided the opportunity to log impressions and provide corresponding demographics information if the user of the client device 102 is a subscriber of services of those database proprietors.

In some examples, prior to sending the beacon response 222 to the client device 102, the AME impressions collector 218 replaces site IDs (e.g., URLs) of media provider(s) that served the media 206 with modified site IDs (e.g., substitute site IDs) which are discernable only by the AME 114 to identify the media provider(s). In some examples, the AME impressions collector 218 may also replace a host website ID (e.g., www.acme.com) with a modified host site ID (e.g., a substitute host site ID) which is discernable only by the AME 114 as corresponding to the host website via which the media 206 is presented. In some examples, the AME impressions collector 218 also replaces the media identifier 213 with a modified media identifier 213 corresponding to the media 206. In this way, the media provider of the media 206, the host website that presents the media 206, and/or the media identifier 213 are obscured from the database proprietor 116, but the database proprietor 116 can still log impressions based on the modified values which can later be deciphered by the AME 114 after the AME 114 receives logged impressions from the database proprietor 116. In some examples, the AME impressions collector 218 does not send site IDs, host site IDS, the media identifier 213 or modified versions thereof in the beacon response 222. In such examples, the client device 102 provides the original, non-modified versions of the media identifier 213, site IDs, host IDs, etc. to the database proprietor 116.

In the illustrated example, the AME impression collector 218 maintains a modified ID mapping table 228 that maps original site IDs with modified (or substitute) site IDs, original host site IDs with modified host site IDs, and/or maps modified media identifiers to the media identifiers such as the media identifier 213 to obfuscate or hide such information from database proprietors such as the database proprietor 116. Also in the illustrated example, the AME impressions collector 218 encrypts all of the information received in the beacon/impression request 212 and the modified information to prevent any intercepting parties from decoding the information. The AME impressions collector 218 of the illustrated example sends the encrypted information in the beacon response 222 to the client device 102 so that the client device 102 can send the encrypted information to the database proprietor 116 in the beacon/impression request 226. In the illustrated example, the AME impressions collector 218 uses an encryption that can be decrypted by the database proprietor 116 site specified in the HTTP "302 Found" re-direct message.

Periodically or aperiodically, the impression data collected by the database proprietor 116 is provided to a DP impressions collector 232 of the AME 114 as, for example, batch data. As discussed above, the client devices 102d, 102e of FIG. 1 do not have DP IDs that the database proprietor 116 can use to identify demographics for users of those client devices 102. During a data collecting and merging process to combine demographic and impression data from the AME 114 and the database proprietor(s) 116, impressions logged by the AME 114 for the client devices 102d, 102e will not correspond to impressions logged by the database proprietor 116 because the database proprietor 116 does not log impressions for the client devices 102d, 102e that do not have DP IDs.

Additional examples that may be used to implement the beacon instruction processes of FIG. 2 are disclosed in Mainak et al., U.S. Pat. No. 8,370,489, which is hereby incorporated herein by reference in its entirety. In addition, other examples that may be used to implement such beacon instructions are disclosed in Blumenau, U.S. Pat. No. 6,108,637, which is hereby incorporated herein by reference in its entirety.

In the example of FIG. 2, the AME 114 includes the example coverage corrector 202 to correct unique audience values and impression counts for impressions reported by client devices 102 for which the database proprietor 116 has non-coverage of identifiable DP IDs on one or more of those client devices 102. The coverage corrector 202 of the illustrated example is provided with an example missing-audience (M-A) factor determiner 234, an example unique audience corrector 236, and an example impressions corrector 238.

The example missing-audience factor determiner 234 of FIG. 2 is provided to calculate a M-A factor representative of the amount of non-coverage (e.g., impressions collected by the AME 114 but not the database proprietor 116) relative to an amount of coverage (e.g., impressions collected by the AME 114 and the database proprietor 116 for which the database proprietor 116 does have coverage). As discussed above, non-coverage occurs when the database proprietor 116 is unable to identify a client device 102 (e.g., the client devices 102d, 102e) due to such client device not having a device/user identifier (e.g., the device/user identifier 227 of FIG. 2) corresponding to a subscriber of the database proprietor 116. As also discussed above, coverage occurs when the database proprietor 116 is able to identify a client device 102 (e.g., the client devices 102d, 102e) due to such client device having a device/user identifier (e.g., the device/user identifier 227 of FIG. 2) corresponding to a subscriber of the database proprietor 116.

In the illustrated example, the missing-audience factor determiner 234 determines M-A factors for different demographic groups based on historical impressions (e.g., the example historical impressions of the example combined impressions table 300 of FIG. 3) collected by the AME 114 and the database proprietor 116 based on panelists of the AME 114, some or all of which are also registered subscribers of the database proprietor 116. For example, the AME impressions collector 218 can log impressions of AME panelists in association with known panelist demographics, and the DP impressions collector 232 can obtain individual demographic impression records from the database proprietor 116 based on consent from registered subscribers of the database proprietor 116 that are also AME panelists. The missing-audience factor determiner 234 can associate impressions from the database proprietor 116 with corresponding impressions logged by the AME 114 that correspond to the same person. In this manner, the missing-audience factor determiner 234 can determine AME panelists for which the database proprietor 116 has non-coverage (e.g., AME panelists for which the database proprietor 116 does not recognize a DP ID and, thus, does not log an impression as shown in the example table 300 of FIG. 3). Using the identified non-coverage of the database proprietor 116, the missing-audience factor determiner 234 can determine M-A factors for different demographic groups based on the historical impressions.

The example unique audience corrector 236 is provided to correct unique audience sizes or quantities by applying the M-A factor (determined by the missing-audience factor determiner 234) to total unique audience sizes corresponding to total impressions collected by the AME 114. The example impressions corrector 238 is provided to correct an impressions count by applying the M-A factor (determined by the missing-audience factor determiner 234) to the total number of impressions collected by the AME 114.

Although the coverage corrector 202 is shown as being located in the AME 114, the coverage corrector 202 may alternatively be located anywhere including at the database proprietor 116 or at any other suitable location separate from the AME 114 and the database proprietor 116. In addition, although the AME impressions collector 218, the modified ID map 228, and the DP impressions collector 232 are shown separate from the coverage corrector 202, one or more of the AME impressions collector 218, the modified ID map 228, and the DP impressions collector 232 may be implemented in the coverage corrector 202.

While an example manner of implementing the example coverage corrector 202, the example impressions collector 218, the example modified ID map 228, the example DP impressions collector 232, the example missing-audience factor determiner 234, the example unique audience corrector 236, and the example impressions corrector 238 is illustrated in FIG. 2, one or more of the elements, processes and/or devices illustrated in FIG. 2 may be combined, divided, re-arranged, omitted, eliminated and/or implemented in any other way. Further, the example coverage collector 202, the example AME impressions collector 218, the example modified ID map 228, the example DP impressions collector 232, the example missing-audience factor determiner 234, the example unique audience corrector 236, and/or the example impressions corrector 238 of FIG. 2 may be implemented by hardware, software, firmware, and/or any combination of hardware, software and/or firmware. Thus, for example, any of the example coverage collector 202, the example AME impressions collector 218, the example modified ID map 228, the example DP impressions collector 232, the example missing-audience factor determiner 234, the example unique audience corrector 236, and/or the example impressions corrector 238 could be implemented by one or more analog or digital circuit(s), logic circuits, programmable processor(s), application specific integrated circuit(s) (ASIC(s)), programmable logic device(s) (PLD(s)), and/or field programmable logic device(s) (FPLD(s)). When reading any of the apparatus or system claims of this patent to cover a purely software and/or firmware implementation, at least one of the example coverage collector 202, the example AME impressions collector 218, the example modified ID map 228, the example DP impressions collector 232, the example missing-audience factor determiner 234, the example unique audience corrector 236, and/or the example impressions corrector 238 is/are hereby expressly defined to include a tangible computer readable storage device or storage disk such as a memory, a digital versatile disk (DVD), a compact disk (CD), a Blu-ray disk, etc. storing the software and/or firmware. Further still, the example coverage corrector 202, the example impressions collector 218, the example modified ID map 228, the example DP impressions collector 232, the example missing-audience factor determiner 234, the example unique audience corrector 236, and the example impressions corrector 238 of FIG. 2 may include one or more elements, processes and/or devices in addition to, or instead of, those illustrated in FIG. 2, and/or may include more than one of any or all of the illustrated elements, processes and devices.

FIG. 3 illustrates an example combined impressions table 300 based on impressions collected by the AME 114 and the database proprietor 116 of FIGS. 1 and 2 for different demographic groups. The impressions collected by the AME 114 and the database proprietor 116 shown in the example table 300 are historical impressions that are used to calculate M-A factors for different demographic groups. In the illustrated example, the database proprietor 116 provides its logged impression records with corresponding DP IDs shown in FIG. 3 to the AME 114 (e.g., based on consent from AME panelists that are also registered subscribers of the database proprietor 116) so that the AME 114 can determine the M-A factors for the different demographic groups. For example, after the missing-audience factor determiner 234 determines the M-A factors for the different demographic groups based on the historical impressions of the example table 300 of FIG. 3, the M-A factors can be subsequently used a number of times on large logs of impressions collected by the database proprietor 116 to correct for the database proprietor's non-coverage of some client devices that affects accuracies of unique audience sizes and impression counts generated using the database proprietor's logged impressions. In some examples, the M-A factors are applied on aggregated demographic impression data (e.g., not individual impression records as shown in FIG. 3) generated by the database proprietor 116 such as the data shown in example table 400 of FIG. 4.

In the illustrated example of FIG. 3, impression records (IMP #) 1-22 correspond to historical impressions collected by both the AME 114 and the database proprietor 116. That is, each of the impression records (IMP #) 1-22 includes a corresponding AME ID and a corresponding DP ID. In the illustrated example, impression records (IMP #) 23-28 correspond to historical impressions collected by the AME 114 but not the database proprietor 116. As such, each of the impression records (IMP #) 23-28 includes a corresponding AME ID but does not have a corresponding DP ID. Thus, the impressions (IMP #) 23-28 of FIG. 3 not having DP IDs recognizable by the database proprietor 116 represent instances of the database proprietor's non-coverage of some client devices. The non-coverage represented by the impressions (IMP #) 23-28 of the historical impressions of FIG. 3 are representative of proportions of non-coverage of client devices that the database proprietor 116 is likely to have for different demographic groups when logging subsequent impressions for persons that may or may not be AME panelists. Therefore, calculating M-A factors based on the historical impressions of the example table 300 of FIG. 3 results in M-A factors that can be used to correct for the database proprietor's non-coverage of client devices in impressions subsequently collected by the database proprietor 116.

The non-coverage corresponding to the impressions (IMP #) 23-28 of FIG. 3 not having DP IDs recognizable by the database proprietor 116 results in inaccurate unique audience values, total impressions, and impressions frequency generated by the AME 114 based on the historical logged impressions of FIG. 3. That is, because the database proprietor 116 does not log impressions (e.g., the impressions 23-28 of FIG. 3) when recognizable DP IDs are not located in beacon/impression requests 226 (FIG. 2) and/or otherwise provided by the corresponding client device, the total impressions logged by the database proprietor 116 are not complete. Examples disclosed herein are useful to adjust/compensate impressions to overcome such incompleteness of logged impressions due to non-coverage so that the AME 114 can generate relatively more accurate unique audience values, total impressions, and impressions frequency than can be achieved using prior techniques when the non-coverage shown in FIG. 3 exists in logged impressions.

In the simplified example impressions table 300 of FIG. 3, all of the impressions (IMP #) 1-28 are demographic impressions that are associated with corresponding demographic groups (e.g., demographic groups defined by age and gender and/or any other demographic criteria). The demographic groups associated with each of the impressions are identified by the AME 114 and/or the database proprietor 116 based on device/user identifiers (e.g., the device/user identifier 214 of FIG. 2) and previously collected AME panelist data and/or DP subscriber registration data.

FIG. 4 illustrates an example table 400 showing demographic-based unique audience values, total impressions values, and impression frequency values based on impressions collected by the database proprietor 116 of FIGS. 1 and 2 and having inaccuracies due to non-coverage of impressions corresponding to client devices not having device/user identifiers recognizable by the database proprietor 116. The demographic groups of FIG. 4 include females younger than 50 years (F<50), females 50 years old and older (F>=50), males younger than 50 years (M<50), and males 50 years old and older (M>=50). The example demographic-based unique audience values, total impressions values, and impression frequency values of the example table 400 of FIG. 4 are determined using impressions collected by the database proprietor 116 based on client devices corresponding to subscribers of the database proprietor 116 regardless of whether those subscribers are also panelist members of the AME 114. That is, unlike the impressions shown in the example table 300 of FIG. 3 that corresponded to AME panelists (of which some or all are also database proprietor subscribers) and which are used by the missing-audience factor determiner 234 to determine M-A factors for different demographic groups, the database proprietor impressions used to generate the data in the example table 400 of FIG. 4 are logged by the database proprietor 116 regardless of whether corresponding subscribers of those impressions are AME panelists. This is because the impressions of the example table 300 of FIG. 3 are used by the missing-audience factor determiner 234 to generate M-A factors (e.g., M-A factors which are based on correlating true, known demographics of the AME panelists with corresponding impressions collected by the database proprietor 116 for those same AME panelists) that can be subsequently used to correct subsequently collected impression-based data (e.g., the impression-based data of the example table 400 of FIG. 4) for database proprietor non-coverage due to not having DP IDs set on some client devices.

In the illustrated example of FIG. 4, the database proprietor aggregate demographic impression-based data of the table 400 is aggregate data generated by the database proprietor 116 of FIGS. 1 and 2. In the illustrated example, the database proprietor 116 provides the AME 114 with such aggregate demographic impression-based data to protect the privacies of database proprietor subscribers. That is, by not providing individual impression records such as shown in the example table 300 of FIG. 3, the database proprietor 116 does not reveal the identities of its subscribers to the AME 114, thereby protecting the privacies of its subscribers. In other examples, when database proprietor subscribers consent to sharing their demographic information and identities with third parties, the database proprietor 116 may share individual impression records (such as the impression records of the example table 300 of FIG. 3) with the AME 114. In such examples, the AME 114 may generate aggregate demographic impression-based data (such as the data shown in FIG. 4) based on the individual impression records provided by the database proprietor 116.

In the illustrated example of FIG. 4, the database proprietor 116 uses its logged impressions to determine an example database proprietor unique audience size (DP_UA) or database proprietor unique audience quantity 402, example database proprietor total impressions (DP_IMP) 404, and an example database proprietor impressions frequency (DP_FREQ) 406 of the illustrated example of FIG. 4. In the illustrated example, the database proprietor unique audience quantity 402, the database proprietor total impressions (DP_IMP) 404, and the database proprietor impressions frequency (DP_FREQ) 406 are measures that correspond to database proprietor subscribers. As such, the database proprietor unique audience quantity 402 is a unique audience size of database proprietor subscribers), the example database proprietor total impressions (DP_IMP) 404 are total impressions corresponding to database proprietor subscribers, and the example database proprietor impressions frequency (DP_FREQ) 406 is an impressions frequency corresponding to database proprietor subscribers. In other examples the database proprietor 116 may additionally or alternatively determine any other audience/impression characteristic based on the data collected from the database proprietor 116. In examples in which the database proprietor 116 provides individual impression records to the AME 114, the DP impressions collector 232 (FIG. 2) may process the individual impression records to generate the database proprietor unique audience size (DP_UA) 402, the database proprietor total impressions (DP_IMP) 404, and the database proprietor impressions frequency (DP_FREQ) 406 of FIG. 4.

As used herein, a unique audience measure (e.g., the database proprietor unique audience size (DP_UA) 402 of FIG. 4) is based on audience members distinguishable from one another. That is, a particular audience member exposed to particular media is measured as a single unique audience member regardless of how many times that audience member is exposed to that particular media. If that particular audience member is exposed multiple times to the same media, the multiple exposures for the particular audience member to the same media is counted as only a single unique audience member. In this manner, impression performance for particular media is not disproportionately represented when a small subset of one or more audience members is exposed to the same media an excessively large number of times while a larger number of audience members is exposed fewer times or not at all to that same media. By tracking exposures to unique audience members, a unique audience measure may be used to determine a reach measure to identify how many unique audience members are reached by media. In some examples, increasing unique audience and, thus, reach, is useful for advertisers wishing to reach a larger audience base.

The database proprietor unique audience size (DP_UA) 402 of FIG. 4 represents a number of database proprietor subscribers (e.g., people registered or subscribed to use the services of the database proprietor 116) exposed to particular media. In the illustrated example, the database proprietor 116 and/or the DP impressions collector 232 of FIG. 2 determine(s) the database proprietor unique audience size (DP_UA) 402 based on impressions logged by the database proprietor 116 for client devices 102 that do have DP IDs without counting more than one impression logged for each unique registered subscriber of the database proprietor 116.

As used herein, total impressions (e.g., the database proprietor impressions (DP_IMP) 404 of FIG. 4) refers to the total number of collected impressions for particular media regardless of whether multiple ones of those impressions are attributable to the same audience members. That is, multiple impressions accounted for in the total impressions may be attributable to a same audience member. The database proprietor impressions (DP_IMP) 404 of FIG. 4 are total impressions logged by the database proprietor 116 for particular media accessed via client devices 102 that have DP IDs recognizable by the database proprietor 116 to identify a subscriber registered with the database proprietor 116.

As used herein, impressions frequency (e.g., the database proprietor frequency (DP_FREQ) 408 of FIG. 4) is a number of total impressions (e.g., the database proprietor impressions (DP_IMP) 404 of FIG. 4) divided by a quantity of unique audience members (e.g., the database proprietor unique audience size (DP_UA) 402 of FIG. 4) (e.g., DP_FREQ=DP_IMP/DP_UA). For example, for the demographic group of females younger than 50 (F<50), the database proprietor frequency (DP_FREQ) is 3.1, which is calculated by dividing 261,644 total impressions (DP_IMP) by 83,758 unique audience (DP_UA).

FIG. 5 is an example table 500 showing example missing-audience (M-A) factors 502 calculated by the coverage corrector 202 of FIG. 2 for the different demographic groups represented in the table 500 of FIG. 5. The M-A factors 502 of the illustrated example are determined using Equation 1 below.

$$\text{M-A Factor}_{(DEMO\ GP)} = (\text{DP non-coverage quantity})_{(DEMO\ GP)} / (\text{DP coverage quantity})_{(DEMO\ GP)} \quad \text{Equation 1}$$

In Equation 1 above, the "DP non-coverage quantity" is a quantity of unique audience members in a demographic group (DEMO GP) that do not have DP device and/or user identifiers on their client devices. That is, the "DP non-coverage quantity" is a number of unique audience members (e.g., a unique audience count) for a demographic group (DEMO GP) for which impressions were logged by the AME 114 for client devices 102 (FIG. 1) that do not have a device and/or user identifier (DP ID) recognizable by the database proprietor 116. Also in Equation 1 above, the "DP coverage quantity" is a quantity of unique audience members in a demographic group (DEMO GP) that have DP device and/or user identifiers on their client devices. That is, the "DP coverage quantity" is a number of unique audience members (e.g., a unique audience count) for the demographic group (DEMO GP) for which impressions were logged by the database proprietor 116 based on client devices 102 having a device and/or user identifier (DP ID) recognizable by the database proprietor 116. Thus, according to Equation 1 above, an M-A factor 502 of FIG. 5 for a particular demographic group is determined by obtaining a unique audience count (e.g., a number of unique audience members) for which impressions were logged by the AME 114 for client devices 102 (FIG. 1) that do not have a device/user identifier (DP ID) recognizable by the database proprietor 116 (e.g., a DP non-coverage quantity), and dividing that unique audience count by the number of unique audience members (e.g., another unique audience count) for which impressions were logged by the database proprietor 116 based on client devices 102 having a device/user identifier (DP ID) recognizable by the database proprietor 116 (e.g., a DP coverage quantity).

For example, the M-A factor 502 for the demographic group F<50 is 67%, which the missing-audience factor determiner 234 determines based on impression records (IMP #) 3, 7, 11, 26, and 27 of FIG. 3 belonging to the F<50 demographic group. In the illustrated example of FIG. 3, the missing-audience factor determiner 234 determines that impression records (IMP #) 3, 7, and 11 correspond to client devices 102 having DP IDs. For example, impression record 3 corresponds to DP ID number 2, impression record 7 corresponds to DP ID number 4, and impression record 11 corresponds to DP ID number 8. Also in the illustrated example of FIG. 3, impression records 26 and 27 correspond to client devices 102 that do not have DP IDs. As such, the database proprietor 116 has coverage for impression records 3, 7, and 11 but has non-coverage for impression records 26 and 27. In the illustrated example, the missing-audience factor determiner 234 determines that the coverage impression numbers 3, 7, and 11 correspond to the "DP coverage quantity" of Equation 1. In addition, the missing-audience factor determiner 234 determines that the non-coverage impression records 26 and 27 correspond to the "DP non-coverage quantity" of Equation 1. As such, in this example, the missing-audience factor determiner 234 determines that two is the "DP non-coverage quantity," and that three is the "DP coverage quantity." Thus, based on Equation 1 above, the missing-audience factor determiner 234 determines that the M-A factor$_{(DEMO\ GP)}$ is 67% (e.g., M-A factor$_{(DEMO\ GP)}$=2/3) for the F<50 demographic group.

FIG. 6 is an example table 600 showing example coverage-corrected unique audience (CCUA) values 602 and example coverage-corrected impression (CCI) counts 604 for different demographic groups based on the M-A factors 502 of FIG. 5. In the illustrated example, the unique audience corrector 236 of FIG. 2 determines the coverage-corrected unique audience values 602 using Equation 2 below.

$$\text{CCUA} = \text{DP\_UA} + (\text{M-A factor} \times \text{DP\_UA}) \quad \text{Equation 2}$$

In Equation 2 above, the unique audience corrector 236 determines the coverage-corrected unique audience (CCUA) 602 by adding the database proprietor unique audience (DP_UA) value to the product of the M-A factor and the database proprietor unique audience (DP_UA) value. For example, the unique audience corrector 236 calculates the coverage-corrected unique audience (CCUA) 602 for the demographic group F<50 by multiplying 67% (the M-A factor of FIG. 5 for the demographic group F<50) by 83,758 (the DP_UA of FIG. 4 for the demographic group F<50) to generate the product of 56,117 (M-A factor×DP_UA). The example unique audience corrector 236 then adds the resulting product (55,838) to 83,758 (the DP_UA of FIG. 4) to generate the coverage-corrected unique audience (CCUA) of 139,597. Thus, the unique audience corrector 236 adjusts the coverage-corrected unique audience (CCUA) based on Equation 2 above to reflect a larger quantity of unique audience members to compensate for the non-coverage of client devices 102 that do not have a DP ID recognizable by the database proprietor 116. That is, the coverage-corrected unique audience (CCUA) sizes 602 of FIG. 6 are larger than the database proprietor unique audience (DP_UA) sizes 402 of FIG. 4 because the coverage-corrected unique audience (CCUA) sizes 602 are adjusted to correspond to quantities of impressions logged by the database proprietor 116 for client devices 102 that do have a DP ID recognizable by the database proprietor 116 and quantities of impressions not logged by the database proprietor 116 due to client devices 102 not having a DP ID recognizable by the database proprietor 116.

In the illustrated example of FIG. 6, impressions corrector 238 of FIG. 2 determines the coverage-corrected impressions (CCI) 604 using Equation 3 below.

$$CCI = CCUA \times DP\_FREQ \qquad \text{Equation 3}$$

In Equation 3 above, the impressions corrector 238 determines the coverage-corrected impressions (CCI) 604 by multiplying the coverage-corrected unique audience (CCUA) value by the database proprietor frequency (DP_FREQ). For example, the impressions corrector 238 calculates the coverage-corrected impressions (CCI) 604 for the demographic group F<50 by multiplying 139,597 (the CCUA for the demographic group F<50) by 3.1 (the DP_FREQ of FIG. 5 for the demographic group F<50). The resulting coverage-corrected impressions (CCI) is 436,074. Thus, the impressions corrector 238 adjusts the coverage-corrected impressions (CCI) based on Equation 3 above to reflect a larger quantity of impressions to compensate for the non-coverage of client devices 102 that do not have a DP ID recognizable by the database proprietor 116. That is, the coverage-corrected impressions (CCI) 604 of FIG. 6 are larger than the database proprietor impressions (DP_IMP) 404 of FIG. 4 because the coverage-corrected impressions (CCI) 604 represent quantities of impressions logged by the database proprietor 116 for client devices 102 that do have a DP ID recognizable by the database proprietor 116 and quantities of impressions not logged by the database proprietor 116 due to client devices 102 not having a DP ID recognizable by the database proprietor 116.

Figure 7:
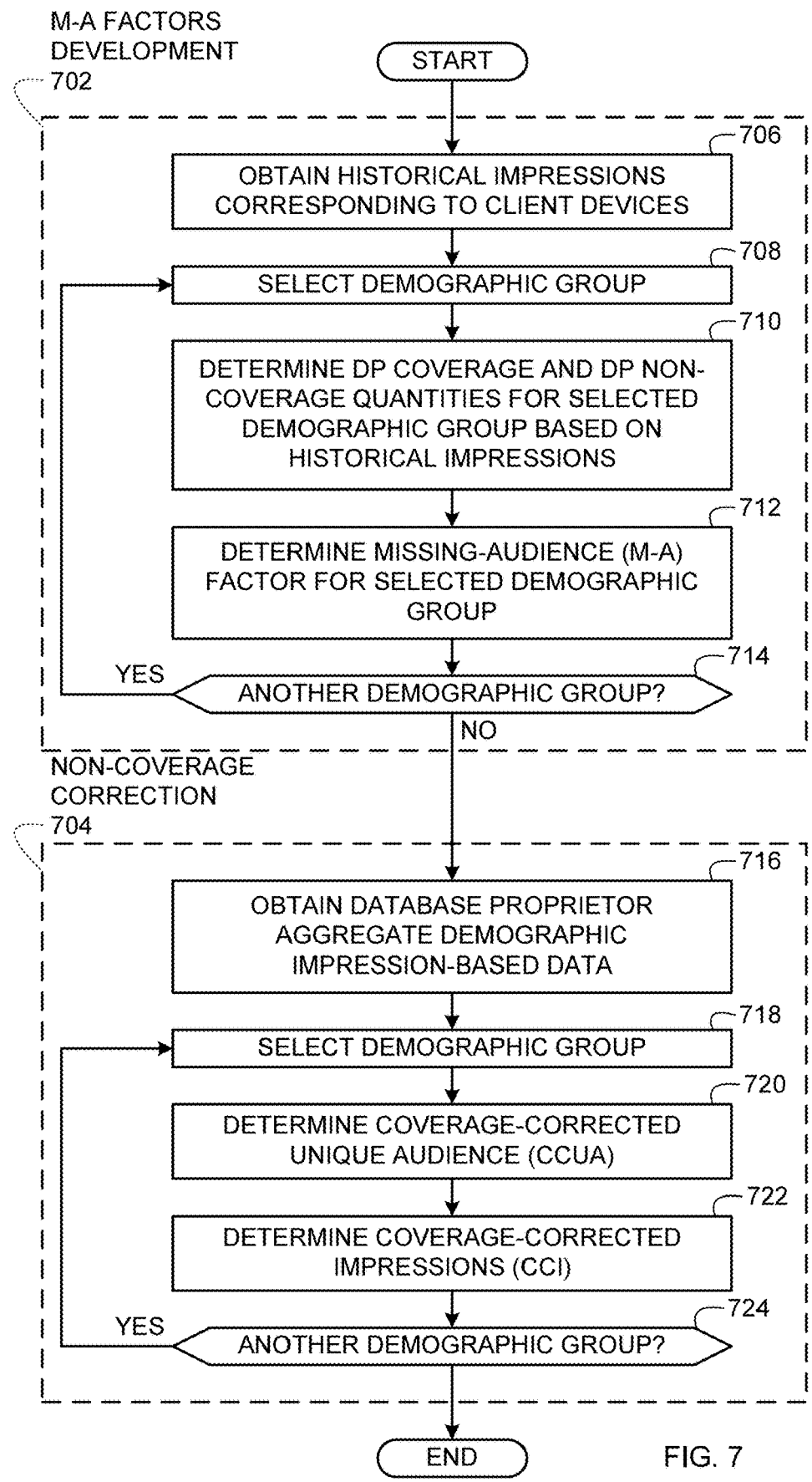
FIG. 7 is a flow diagram representative of machine readable instructions that may be executed to implement the coverage corrector of FIG. 2 to determine the missing-audience factors of FIG. 5 and the coverage-corrected data of FIG. 6.

FIG. 7 is a flow diagram representative of machine readable instructions that may be executed to implement the coverage corrector 202 of FIG. 2 to determine the M-A factors 502 of FIG. 5, the coverage-corrected unique audience (CCUA) 602 of FIG. 6, and the coverage-corrected impressions (CCI) 604 of FIG. 6. In this example, the machine readable instructions comprise a program for execution by a processor such as the processor 812 shown in the example processor platform 800 discussed below in connection with FIG. 8. The program may be embodied in software stored on a tangible computer readable storage medium such as a CD-ROM, a floppy disk, a hard drive, a digital versatile disk (DVD), a Blu-ray disk, or a memory associated with the processor 812, but the entire program and/or parts thereof could alternatively be executed by a device other than the processor 812 and/or embodied in firmware or dedicated hardware. Further, although the example program is described with reference to the flowchart illustrated in FIG. 7, many other methods of implementing the example coverage corrector 202 may alternatively be used. For example, the order of execution of the blocks may be changed, and/or some of the blocks described may be changed, eliminated, or combined.

As mentioned above, the example process of FIG. 7 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example process of FIG. 7 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

The example flow diagram of FIG. 7 is shown as two phases including an example M-A factors development phase 702 and an example non-coverage correction phase 704. During the M-A factors development phase 702, the missing-audience factor determiner 234 (FIG. 2) determines the M-A factors 502 (FIG. 5) for different demographic groups based on historical impressions such as the historical impressions shown in table 300 of FIG. 3. During the non-coverage correction phase 704, the unique audience corrector 236 uses the M-A factors 502 to determine coverage-corrected unique audience sizes (e.g., the coverage-corrected UA (CCUA) 602 of FIG. 6) for different demographic groups. Also during the non-coverage correction phase 704, the impressions corrector 238 determines coverage-corrected impression counts (e.g., the coverage-corrected impressions (CCI) 604 of FIG. 6) for different demographic groups. In some examples, the non-coverage correction phase 704 may begin immediately after the M-A factors development phase 702. In other examples, the non-coverage correction phase 704 may begin after a significant amount of time (e.g., hours, days, weeks, etc.) has passed following the completion of the M-A factors development phase 702. In some examples, the M-A factors development phase 702 and the non-coverage correction phase 704 may be implemented as part of a same program. In other examples, the M-A factors development phase 702 and the non-coverage correction phase 704 may be implemented as two separate programs.

The example M-A factors development phase 702 of FIG. 7 begins at block 706 at which the AME impressions collector 218 and the DP impressions collector 232 collect historical impressions corresponding to client devices 102. For example, the AME impressions collector 218 collects impressions using the techniques described above in connection with FIG. 2, and the DP impressions collector 232 obtains impression records collected by the database proprietor 116 using the techniques described above in connection with FIG. 2.

The example missing-audience factor determiner 234 selects a demographic group (block 708). For example, the missing-audience factor determiner 234 selects one of the demographic groups of FIGS. 4-6. The example missing-audience factor determiner 234 determines a DP coverage amount and a DP non-coverage amount for the selected demographic group based on the historical impressions (block 710). For example, referring to the example table 300 of FIG. 3, the missing-audience factor determiner 234 determines the DP coverage amount for the selected demographic group based on impression records (IMP #) 1-22 and the DP non-coverage amount for the selected demographic group based on impression records (IMP #) 23-28.

The example missing-audience factor determiner 234 determines a M-A factor 502 (FIG. 5) for the selected demographic group (block 712). For example, the missing-audience factor determiner 234 (FIG. 2) determines the M-A factor 502 as described above using Equation 1 based on the DP non-coverage quantity and the DP coverage quantity for the selected demographic group determined at block 710. The example missing-audience factor determiner 234 determines whether there is another demographic group for which to determine an M-A factor (block 714). If there is another demographic group for which to determine an M-A factor 502, control returns to block 708 at which another demographic group is selected. If there is not another demographic group for which to determine an M-A factor 502, The M-A factors development phase 702 ends. In some examples, after the M-A factors development phase 702 ends, control advances immediately to the non-coverage correction phase 704 to correct for non-coverage errors in impressions collected by the database proprietor 116. In other examples, after the M-A factors development phase 702 ends, control advances to the non-coverage correction phase 704 after some time elapses (e.g., hours, days, weeks, etc.).

In the non-coverage correction phase 704 of the illustrated example, the DP impressions collector 232 obtains database proprietor aggregate demographic impression-based data (block 716). For example, the DP impressions collector 232 obtains the database proprietor unique audience (DP_UA) values 402 (FIG. 4), the database proprietor impressions (DP_IMP) 404 (FIG. 4), and the database proprietor frequency (DP_FREQ) 406 (FIG. 4) from the database proprietor 116. For example, the database proprietor 116 logs impressions from client devices 102 as described above in connection with FIG. 2 and determines the database proprietor unique audience (DP_UA) values 402, the database proprietor impressions (DP_IMP) 404, and the database proprietor frequency (DP_FREQ) 406 based on the logged impressions. In this manner, the database proprietor 116 can provide the database proprietor aggregate demographic impression-based data 402, 404, 406 to the DP impressions collector 232. Alternatively, in some examples the DP impressions collector 232 determines the database proprietor unique audience (DP_UA) values 402 (FIG. 4), the database proprietor impressions (DP_IMP) 404 (FIG. 4), and the database proprietor frequency (DP_FREQ) 406 (FIG. 4) based on impression records obtained from the database proprietor 116.

The example coverage corrector 202 selects a demographic group (block 718). For example, the coverage corrector 202 selects one of the demographic groups of FIGS. 4-6. The unique audience corrector 236 (FIG. 2) determines the coverage-corrected unique audience (CCUA) 602 (FIG. 6) (block 720). For example, the unique audience corrector 236 can determine the CCUA 602 based on Equation 2 as described above based on the M-A factor 502 determined in block 712 for the selected demographic group. The impressions corrector 238 (FIG. 2) determines the coverage-corrected impressions (CCI) 604 (FIG. 6) (block 722). For example, the impressions corrector 238 can determine the CCI 604 based on Equation 3 as described above based on the M-A factor 502 determined in block 712 for the selected demographic group.

The coverage corrector 202 determines whether there is another demographic group for which to determine a coverage-corrected unique audience (CCUA) value 602 and/or a coverage-corrected impressions (CCI) value 604 (block 724). If there is another demographic group for which to determine a coverage-corrected unique audience (CCUA) value 602 and/or a coverage-corrected impressions (CCI) value 604, control returns to block 718 at which another demographic group is selected. Otherwise, if there is not another demographic group for which to determine a coverage-corrected unique audience (CCUA) 602 and/or a coverage-corrected impressions (CCI) 604, the example process of FIG. 7 ends.

Figure 8:
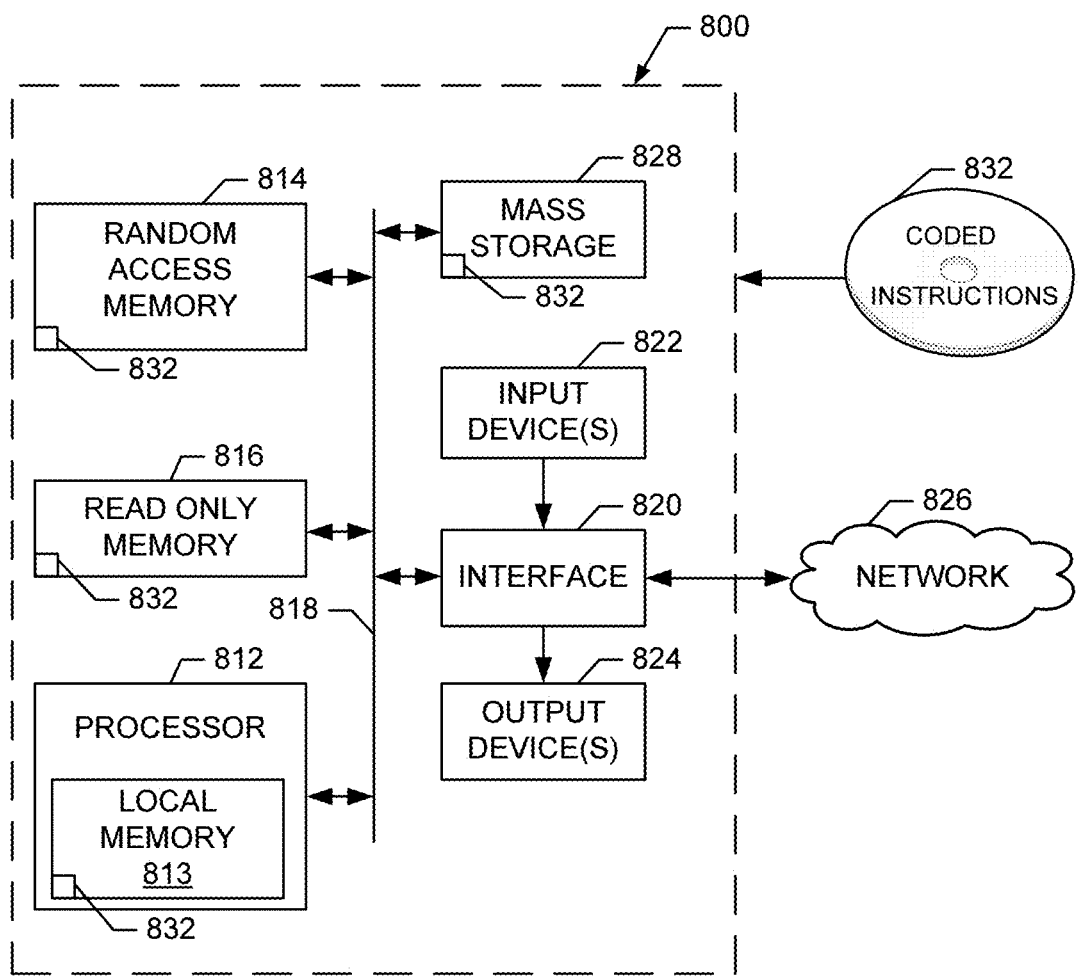
FIG. 8 illustrates an example processor system that can be used to execute the example instructions of FIG. 7 to implement example apparatus and/or methods disclosed herein.

FIG. 8 is a block diagram of an example processor platform 800 capable of executing the instructions of FIG. 7 to implement the coverage corrector 202 of FIG. 2. The processor platform 800 can be, for example, a server, a personal computer, or any other type of computing device.

The processor platform 800 of the illustrated example includes a processor 812. The processor 812 of the illustrated example is hardware. For example, the processor 812 can be implemented by one or more integrated circuits, logic circuits, microprocessors or controllers from any desired family or manufacturer.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), and/or a PCI express interface.

In the illustrated example, one or more input devices 822 are connected to the interface circuit 820. The input device(s) 822 permit(s) a user to enter data and commands into the processor 812. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 820 of the illustrated example, thus, typically includes a graphics driver card, a graphics driver chip or a graphics driver processor.

The interface circuit 820 of the illustrated example also includes a communication device such as a transmitter, a receiver, a transceiver, a modem and/or network interface card to facilitate exchange of data with external machines (e.g., computing devices of any kind) via a network 826 (e.g., an Ethernet connection, a digital subscriber line (DSL), a telephone line, coaxial cable, a cellular telephone system, etc.).

The processor platform 800 of the illustrated example also includes one or more mass storage devices 828 for storing software and/or data. Examples of such mass storage devices 828 include floppy disk drives, hard drive disks, compact disk drives, Blu-ray disk drives, RAID systems, and digital versatile disk (DVD) drives.

Coded instructions 832 include the machine readable instructions of FIG. 7 and may be stored in the mass storage device 828, in the volatile memory 814, in the non-volatile memory 816, and/or on a removable tangible computer readable storage medium such as a CD or DVD.

From the foregoing, it will be appreciated that above disclosed methods, apparatus and articles of manufacture are useful to enhance the operations of a computer to improve the accuracy of impression-based data such as unique audience and impression counts so that computers and processing systems therein can be relied upon to produce audience analysis information with higher accuracies. In some examples, computer operations can be made more efficient based on the above equations for determining M-A factors, coverage-corrected unique audience (CCUA), and coverage-corrected impressions (CCI). That is, through the use of these processes, computers can operate more efficiently by using fewer processor cycles to relatively quickly identify parameter values needed to determine coverage-corrected data and applying those parameter values through the above equations to determine the coverage-corrected data. Such coverage-corrected data is useful in subsequent processing for identifying exposure performances of different media so that media providers, advertisers, product manufacturers, and/or service providers can make more informed decisions on how to spend advertising dollars and/or media production and distribution dollars. Furthermore, example methods, apparatus, and/or articles of manufacture disclosed herein overcome the technical problem of counting impressions of media on media devices which do not have a user/device identifier such as cookies and/or other identifiers. Example methods, apparatus, and/or articles of manufacture disclosed herein solve this problem without forcing such devices to store user/device identifiers and without requiring follow-up network communications with the client device. This solution, thus, avoids creating additional network traffic and further avoids the requirement to store additional data such as identifiers at client devices.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
a missing-audience factor determiner to determine a missing-audience factor via a processor based on a first quantity of impressions logged by a first server for first client devices, and based on a second quantity of the impressions logged by the first server for second client devices, the first client devices not including database proprietor identifiers, the second client devices including the database proprietor identifiers, the first and second quantities of impressions indicative of accesses to media at the first and second client devices; and
a unique audience size corrector to, via the processor:
  access a unique audience size of database proprietor subscribers exposed to the media, the unique audience size of the database proprietor subscribers generated by a process of a second server of a database proprietor based on a third quantity of impressions corresponding to the second client devices including the database proprietor identifiers exclusive of a fourth quantity of impressions corresponding to the first client devices not including the database proprietor identifiers; and
  apply the missing-audience factor to the unique audience size of the database proprietor subscribers exposed to the media to produce a coverage-corrected unique audience size that corrects the unique audience size generated by the second server of the database proprietor by using the coverage-corrected unique audience size to represent the first and second client devices in place of the unique audience size that corresponds to the second client devices exclusive of the first client devices.

2. The apparatus of claim 1, further including an impressions corrector, implemented in a circuit, to determine a coverage-corrected impression count based on the coverage-corrected unique audience size and an impressions frequency, the coverage-corrected impression count representative of the third quantity of impressions corresponding to the second client devices and the fourth quantity of impressions corresponding to the first client devices.

3. The apparatus of claim 2, wherein the impressions frequency is the third quantity of impressions divided by the unique audience size of the database proprietor subscribers.

4. The apparatus of claim 1, wherein the missing-audience factor determiner is to determine the missing-audience factor by dividing the first quantity of the impressions corresponding to the first client devices not including the database proprietor identifiers by the second quantity of the impressions corresponding to the second client devices including the database proprietor identifiers.

5. The apparatus of claim 1, wherein the missing-audience factor determiner is to determine the missing-audience factor for a demographic group identified by the database proprietor for the second client devices, and the unique audience size corrector is to determine the coverage-corrected unique audience size for the demographic group.

6. The apparatus of claim 1, wherein the missing-audience factor determiner and the unique audience size corrector are operated by an audience measurement entity separate from the database proprietor.

7. The apparatus of claim 1, wherein the database proprietor is at least one of a social network service provider or an email service provider.

8. The apparatus of claim 1, further including an impressions collector to, via the processor, facilitate logging of the third quantity of impressions at the second server of the database proprietor based on instructing the first and second client devices via redirect network communications that cause the first and second client devices to communicate with the second server of the database proprietor to enable the second server of the database proprietor to log the third quantity of impressions.

9. The apparatus of claim 8, wherein the impressions collector is to instruct the first and second client devices to provide an identifier to the second server of the database proprietor.

10. A non-transitory computer readable storage medium comprising instructions that, when executed, cause a processor to at least:
determine a missing-audience factor based on a first quantity of impressions logged by a first server for first client devices, and based on a second quantity of the impressions logged by the first server for second client devices, the first client devices not including database proprietor identifiers, the second client devices including the database proprietor identifiers, the first and second quantities of impressions indicative of accesses to media at the first and second client devices;
access a unique audience size of database proprietor subscribers exposed to the media, the unique audience size of the database proprietor subscribers generated by a process of a second server of a database proprietor based on a third quantity of impressions corresponding to the second client devices including the database proprietor identifiers exclusive of a fourth quantity of impressions corresponding to the first client devices not including the database proprietor identifiers; and
apply the missing-audience factor to the unique audience size of the database proprietor subscribers exposed to the media to produce a coverage-corrected unique audience size that corrects the unique audience size generated by the second server of the database proprietor by using the coverage-corrected unique audience size to represent the first and second client devices in place of the unique audience size that corresponds to the second client devices exclusive of the first client devices.

11. The non-transitory computer readable storage medium of claim 10, wherein the instructions are further to cause the processor to determine a coverage-corrected impression count based on the coverage-corrected unique audience size and an impressions frequency, the coverage-corrected impression count representative of the third quantity of impressions corresponding to the second client devices and the fourth quantity of impressions corresponding to the first client devices.

12. The non-transitory computer readable storage medium of claim 11, wherein the impressions frequency is the third quantity of impressions divided by the unique audience size of the database proprietor subscribers.

13. The non-transitory computer readable storage medium of claim 10, wherein the instructions are to cause the processor to determine the missing-audience factor by dividing the first quantity of the impressions corresponding to the first client devices not including the database proprietor identifiers by the second quantity of the impressions corresponding to the second client devices including the database proprietor identifiers.

14. The non-transitory computer readable storage medium of claim 10, wherein the instructions are to cause the processor to determine the missing-audience factor for a demographic group identified by the database proprietor for the second client devices, and to determine the coverage-corrected unique audience size for the demographic group.

15. The non-transitory computer readable storage medium of claim 10, wherein the instructions are to cause the processor to determine the missing-audience factor and the coverage-corrected unique audience size at an audience measurement entity separate from the database proprietor.

16. The non-transitory computer readable storage medium of claim 10, wherein the database proprietor is at least one of a social network service provider or an email service provider.

17. The non-transitory computer readable storage medium of claim 10, wherein the instructions are further to cause the processor to send redirect network communications to the first and second client devices to cause the first and second client devices to communicate with the second server of the database proprietor to enable the second server of the database proprietor to log the third quantity of impressions.

18. The non-transitory computer readable storage medium of claim 17, wherein the instructions are further to cause the processor to instruct the first and second client devices to provide an identifier to the second server of the database proprietor.

19. An apparatus comprising:
means for determining a missing-audience factor based on a first quantity of impressions logged by a first server for first client devices, and based on a second quantity of the impressions logged by the first server for second client devices, the first client devices not including database proprietor identifiers, the second client devices including the database proprietor identifiers, the first and second quantities of impressions indicative of accesses to media at the first and second client devices; and
means for correcting a unique audience size to:
access the unique audience size of database proprietor subscribers exposed to the media, the unique audience size of the database proprietor subscribers generated by a process of a second server of a database proprietor based on a third quantity of impressions corresponding to the second client devices including the database proprietor identifiers exclusive of a fourth quantity of impressions corresponding to the first client devices not including the database proprietor identifiers; and
apply the missing-audience factor to the unique audience size of the database proprietor subscribers exposed to the media to produce a coverage-corrected unique audience size that corrects the unique audience size generated by the second server of the database proprietor by using the coverage-corrected unique audience size to represent the first and second client devices in place of the unique audience size that corresponds to the second client devices exclusive of the first client devices.

20. The apparatus of claim 19, further including means for determining a coverage-corrected impression count based on the coverage-corrected unique audience size and an impressions frequency, the coverage-corrected impression count representative of the third quantity of impressions corresponding to the second client devices and the fourth quantity of impressions corresponding to the first client devices.

21. The apparatus of claim 20, wherein the impressions frequency is the third quantity of impressions divided by the unique audience size of the database proprietor subscribers.

22. The apparatus of claim 19, wherein the means for determining the missing-audience factor is to determine the missing-audience factor by dividing the first quantity of the impressions corresponding to the first client devices not including the database proprietor identifiers by the second quantity of the impressions corresponding to the second client devices including the database proprietor identifiers.

23. The apparatus of claim 19, wherein the means for determining the missing-audience factor is to determine the missing-audience factor for a demographic group identified by the database proprietor for the second client devices, and the means for correcting the unique audience size is to determine the coverage-corrected unique audience size for the demographic group.

24. The apparatus of claim 19, further including means for instructing the first and second client devices via redirect network communications that cause the first and second client devices to communicate with the second server of the database proprietor to enable the second server of the database proprietor to log the third quantity of impressions.

25. The apparatus of claim 24, wherein the means for instructing is to instruct the first and second client devices to provide an identifier to the second server of the database proprietor.

* * * * *